(12) United States Patent
Tandai et al.

(10) Patent No.: US 10,002,532 B2
(45) Date of Patent: Jun. 19, 2018

(54) COMMUNICATION DEVICE AND METHOD

(71) Applicant: Kabushiki Kaisha Toshiba, Minato-ku (JP)

(72) Inventors: Tomoya Tandai, Ota (JP); Daisuke Uchida, Kawasaki (JP); Tsuyoshi Kogawa, Kawasaki (JP); Tomoko Adachi, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days. days.

(21) Appl. No.: 15/449,539

(22) Filed: Mar. 3, 2017

(65) Prior Publication Data

US 2017/0345298 A1 Nov. 30, 2017

(30) Foreign Application Priority Data

May 30, 2016 (JP) ................. 2016-107220

(51) Int. Cl.
*G08G 1/09* (2006.01)
*G08G 1/01* (2006.01)
(Continued)

(52) U.S. Cl.
CPC ........... *G08G 1/091* (2013.01); *G08G 1/0112* (2013.01); *G08G 1/096783* (2013.01);
(Continued)

(58) Field of Classification Search
CPC .............. G08G 1/091; G08G 1/0112; G08G 1/096783; G08G 1/096791; H04L 7/0008;
(Continued)

(56) References Cited

U.S. PATENT DOCUMENTS

2010/0299001 A1* 11/2010 Suzuki ................. H04W 88/02
701/2

FOREIGN PATENT DOCUMENTS

JP 2003-227721 A 8/2003
JP 4084358 B2 4/2008
(Continued)

*Primary Examiner* — Leon Flores
(74) *Attorney, Agent, or Firm* — Oblon, McClelland, Maier & Neustadt, L.L.P.

(57) ABSTRACT

According to an embodiment, a communication device is provided in a movable body and is wirelessly communicable with a transceiver unit and another movable body. The communication device includes a transmitter, a receiver, a synchronization unit, a registration unit, and a stop control unit. The transmitter transmits movable body information on the movable body to a predetermined channel. The receiver receives transceiver unit information that the transceiver unit has transmitted to the predetermined channel. The synchronization unit performs synchronization of reception timing when the transceiver unit information can be received. The registration unit registers a communication area of the transceiver unit calculated based on a position where the other movable body receives the transceiver unit information in storage. The stop control unit stops transmission of the movable body information at a reception timing of the transceiver unit information, when a position of the movable body is within the registered communication area.

16 Claims, 21 Drawing Sheets

(51) Int. Cl.
    *H04L 7/00*          (2006.01)
    *H04L 29/08*        (2006.01)
    *H04W 4/02*         (2018.01)
    *G08G 1/0967*      (2006.01)
    *H04W 4/04*         (2009.01)
    *H04W 56/00*       (2009.01)

(52) U.S. Cl.
    CPC ..... *G08G 1/096791* (2013.01); *H04L 7/0008* (2013.01); *H04L 67/12* (2013.01); *H04W 4/021* (2013.01); *H04W 4/046* (2013.01); *H04W 56/0025* (2013.01)

(58) Field of Classification Search
    CPC ...... H04L 67/12; H04W 4/021; H04W 4/046; H04W 56/0025
    See application file for complete search history.

(56) References Cited

FOREIGN PATENT DOCUMENTS

| | | |
|---|---|---|
| JP | 2012-221168 A | 11/2012 |
| JP | 5664129 B2 | 2/2015 |
| WO | WO 2004/089008 A1 | 10/2004 |

\* cited by examiner

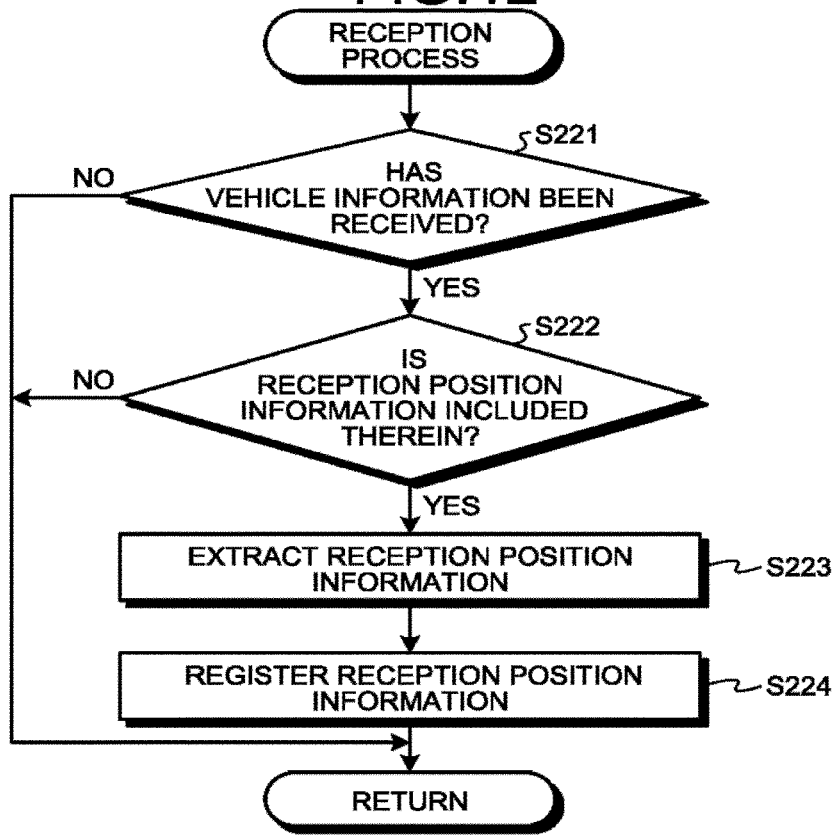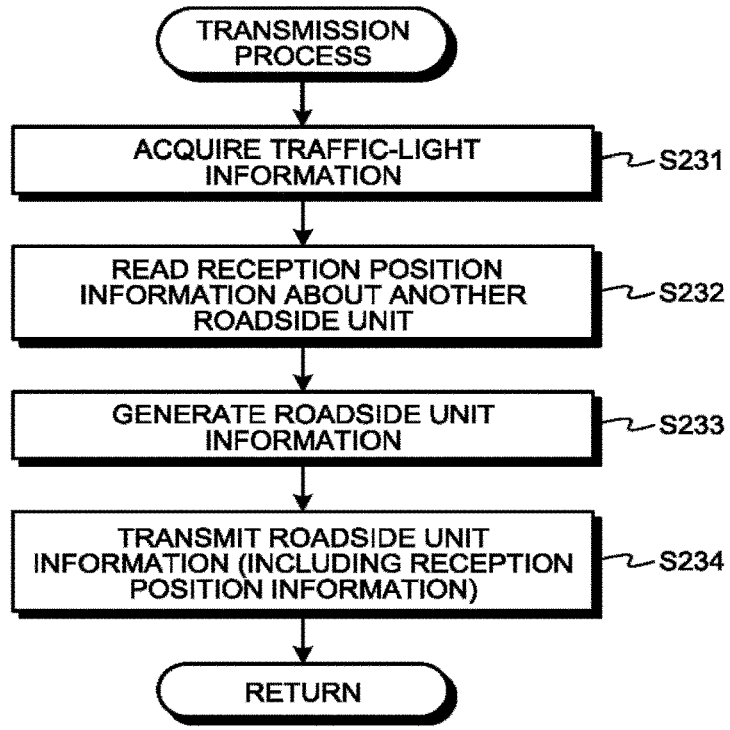

US 10,002,532 B2

COMMUNICATION DEVICE AND METHOD

CROSS-REFERENCE TO RELATED APPLICATIONS

This application is based upon and claims the benefit of priority from Japanese Patent Application No. 2016-107220, filed on May 30, 2016; the entire contents of which are incorporated herein by reference.

FIELD

Embodiments described herein relate generally to a communication device and a communication method.

BACKGROUND

There has been known a traffic control system for improving smooth running of vehicles at an intersection or the like. In the traffic control system, a roadside unit that wirelessly transmits roadside unit information is installed at an intersection. The roadside unit information includes traffic-light information representing a command (a stopping command or a running command) provided to the vehicles by a traffic light. Each of the vehicles can control its own running in response to the command provided by the traffic light by receiving the roadside unit information from the roadside unit.

In the traffic control system, a vehicle wirelessly transmits vehicle information including the running state and the like of the vehicle to other vehicles, and wirelessly receives vehicle information including the running state of other vehicles from these vehicles. Due to this configuration, the vehicle can notify other vehicles behind of the running state of the vehicle, and can control the running of the vehicle corresponding to the running state of other vehicles in front.

In the traffic control system, the roadside unit and the vehicle transmit information to the same channel (the same frequency band). Therefore, when the vehicle is transmitting running information or the like, the vehicle cannot receive information transmitted from other vehicles or from the roadside unit. Further, in a case where the roadside unit and the vehicle simultaneously transmit information, an interference occurs, and any vehicle cannot receive the information from the roadside unit in this case. However, when the vehicle enters into a communication area where information can be received from the roadside unit, it is desirable that the vehicle can receive information from the roadside unit reliably and more quickly.

BRIEF DESCRIPTION OF THE DRAWINGS

FIG. 12 is a flowchart of a reception process in the roadside-unit communication device according to the second embodiment;

FIG. 13 is a flowchart of a transmission process in the roadside-unit communication device according to the second embodiment;

DETAILED DESCRIPTION

According to an embodiment, a communication device is provided in a movable body and is wirelessly communicable with a transceiver unit and with another movable body via a predetermined channel. The communication device includes a transmitter, a receiver, processing circuitry. The transmitter transmits movable body information on the movable body to the predetermined channel. The receiver receives transceiver unit information that the transceiver unit has transmitted to the predetermined channel. The processing circuitry performs a synchronization of a reception timing when the transceiver unit information can be received. The processing circuitry registers a communication area of the transceiver unit calculated based on a position at which the another movable body has received the transceiver unit information in communication-area storage. The processing circuitry stops transmission of the movable body information at a reception timing of the transceiver unit information, when a position of the movable body is within the registered communication area.

Embodiments of a traffic control system 10 are described below in detail with reference to the accompanying drawings. An object of the traffic control system 10 according to the embodiments is that, when a vehicle 20 enters into a communication area where the vehicle 20 can receive information from a roadside unit 30, the traffic control system 10 causes the vehicle 20 to receive the information transmitted from the roadside unit 30 reliably. In the following descriptions, while a plurality of embodiments are explained, constituent elements having mutually common functions are denoted by like reference signs and redundant explanations thereof will be omitted.

First Embodiment

Figure 1:
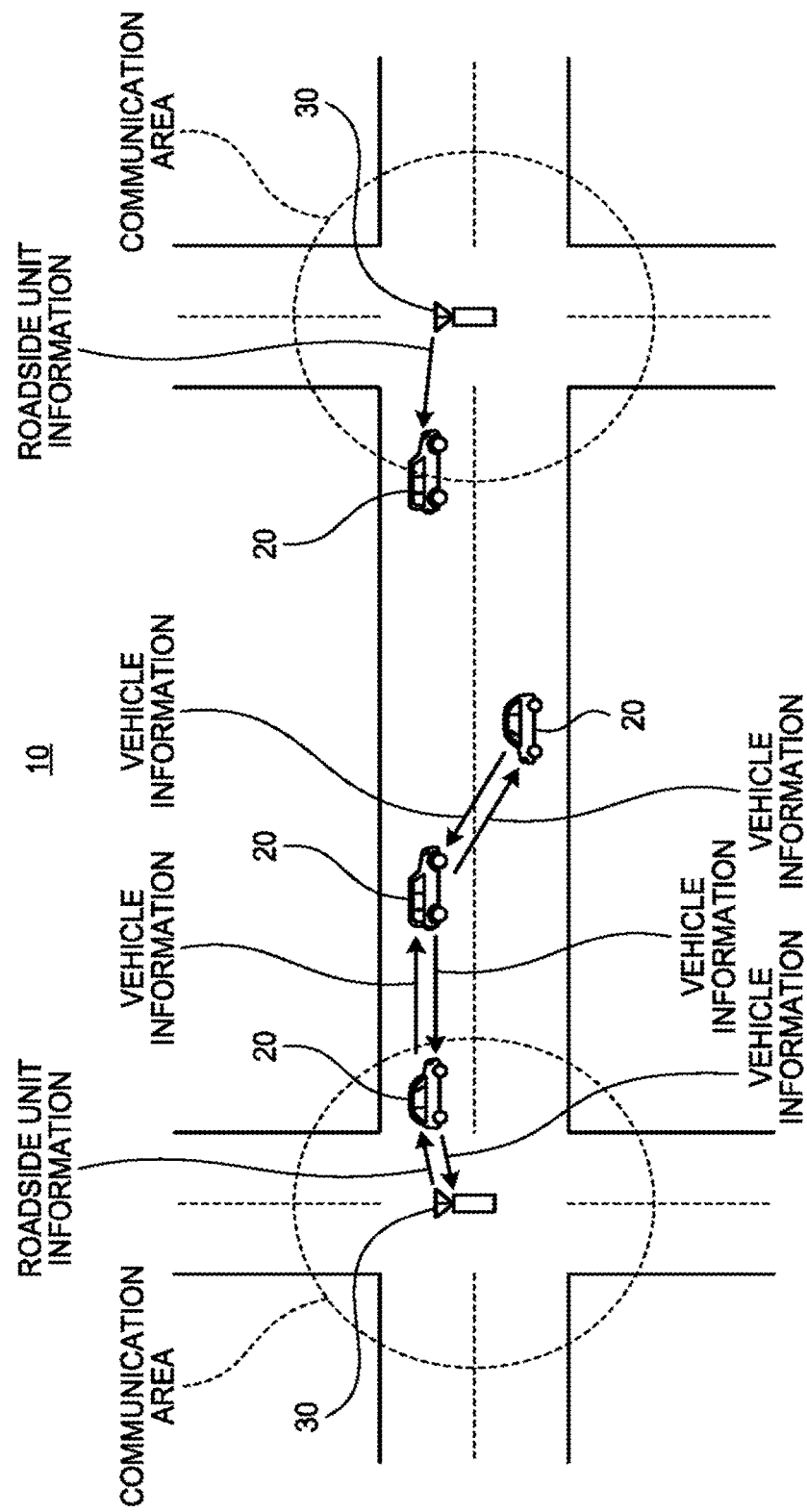
FIG. 1 is a diagram schematically illustrating a traffic control system.
Figure 2:
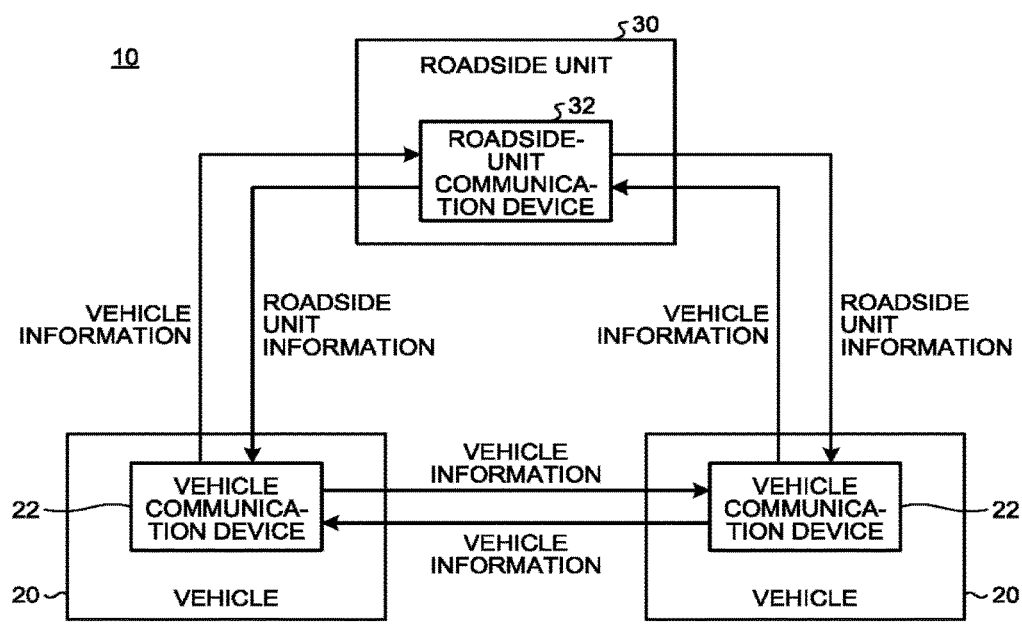
FIG. 2 is a block diagram illustrating a configuration of the traffic control system.

FIG. 1 is a diagram schematically illustrating the traffic control system 10 according to a first embodiment. FIG. 2 is a block diagram illustrating a configuration of the traffic control system 10 according to the first embodiment.

The traffic control system 10 according to the first embodiment includes a plurality of vehicles 20 and at least one roadside unit 30. The vehicle 20 is a movable body that runs on a road, and is an automobile, a motorcycle, and a bicycle, for example. The roadside unit 30 is a device that is installed on the outside of the road. The roadside unit 30 is installed, for example, corresponding to an intersection including a traffic light.

The vehicle 20 includes a vehicle communication device 22. The roadside unit 30 includes a roadside-unit communication device 32. The vehicle communication device 22 and the roadside-unit communication device 32 can communicate information with each other wirelessly via radio waves.

The vehicle communication device 22 and the roadside-unit communication device 32 transmit and receive information to and from a common channel (a common frequency band) with a common method. The vehicle communication device 22 and the roadside-unit communication device 32 encode and modulate information to be transmitted with a preset method, and wirelessly transmit the information to a predetermined channel at a transmission timing set by the device. The information wirelessly transmitted by the vehicle communication device 22 and the roadside-unit communication device 32 is broadcasted to the predetermined channel, and received by other devices located in a communication area.

The vehicle communication device 22 and the roadside-unit communication device 32 become a reception stand-by state where information wirelessly transmitted from other devices to a predetermined channel can be received, in a period other than the transmission timing set by the device. The vehicle communication device 22 and the roadside-unit communication device 32 can receive information from other devices, when the information is transmitted to the predetermined channel from other devices in the period other than the transmission timing set by the device.

However, when a plurality of vehicle communication devices 22 transmit information at the same timing, or the vehicle communication device 22 and the roadside-unit communication device 32 transmit information at the same timing, the vehicle communication device 22 (or the roadside-unit communication device 32), which is present at a position where it is possible to receive the information transmitted from the both devices, cannot receive available information due to an interference.

The roadside-unit communication device 32 transmits roadside unit information including traffic-light information and the like. The traffic-light information represents a command provided to passing vehicles 20 by a traffic light installed at a corresponding intersection. More specifically, the traffic-light information includes a command provided to the passing vehicles 20 and running directions (orientations) of the vehicles 20 to which the command is provided. The command is, for example, a stopping command instructing to stop, and a running command instructing to run. Further, the traffic-light information can include a remaining time until switching to the next command is performed. There may be a case where a plurality of traffic lights are provided in one intersection. In this case, the roadside unit information includes traffic-light information for each of the traffic lights.

The vehicle communication device 22 receives the roadside unit information transmitted from the roadside-unit communication device 32. Accordingly, the vehicle communication device 22 can cause a vehicle control device provided in the vehicle 20 to acquire traffic-light information and the like included in the roadside unit information. The vehicle control device having acquired the traffic-light information can notify a driver of the traffic-light information and can control running by using the traffic-light information.

The vehicle communication device 22 transmits the vehicle information including the running state of the vehicle, the position of the vehicle, the running direction of the vehicle, and the like. The running state includes, for example, information indicating whether the vehicle 20 is stopping or moving, the moving speed, and acceleration.

The vehicle communication device 22 receives the vehicle information transmitted from other vehicles. Accordingly, the vehicle communication device 22 can acquire the running state, the position, and the running direction included in the vehicle information transmitted from other vehicles. The vehicle control device having acquired the running state, the position, and the running direction of other vehicles can notify the driver of the running state and the like of other vehicles 20, and can control running according to the running state and the like of the other vehicles 20.

The roadside-unit communication device 32 receives the vehicle information transmitted from the vehicle communication device 22. Accordingly, the roadside-unit communication device 32 can collect the running information and the like of the vehicles 20 passing the corresponding intersection.

Furthermore, in the first embodiment, upon reception of the roadside unit information from the roadside unit 30 provided at the intersection having passed immediately before, the vehicle communication unit 22 generates reception position information and transmits the vehicle information by including the generated reception position information in the vehicle information. The reception position information includes the position of the vehicle at the time of receiving the roadside unit information last time and identification information for identifying the roadside unit 30 having transmitted the roadside unit information.

Upon reception of the roadside unit information, the vehicle communication device 22 generates reception position information and stores the generated reception position information therein. When the vehicle 20 passes through the communication area of the roadside unit 30, the vehicle communication device 22 receives the roadside unit information plural times. In this case, every time the vehicle communication device 22 receives the roadside unit information, the vehicle communication device 22 generates the reception position information, and overwrites and registers the generated reception position information. Accordingly, the vehicle communication device 22 can register the reception position information indicating the position of the vehicle at the time of receiving the roadside unit information last time. The vehicle communication device 22 then includes the reception position information registered in this manner in the vehicle information, and transmits the vehicle information.

The position of the vehicle having received the roadside unit information last time can be estimated to be near an outer border in the communication area in which the roadside unit information can be received. Therefore, the vehicle communication device 22 can estimate the communication area of the corresponding roadside unit 30 based on the reception position information included in the vehicle information.

Further, in the traffic control system 10, the communication area in which the respective roadside-unit communication devices 32 can transmit the roadside unit information (the area in which the vehicle 20 can receive the roadside unit information) is adjusted so as not to overlap on the communication area of other roadside-unit communication devices 32. For example, the signal strength of the respective roadside-unit communication devices 32 is adjusted so that the roadside unit information can be transmitted to the vehicles 20 within a range of several tens of meters.

A plurality of roadside-unit communication devices 32 transmit the roadside unit information synchronously with each other. That is, the roadside-unit communication devices 32 transmit the roadside unit information at the same timing. Further, the roadside-unit communication devices 32 transmit the roadside unit information, for example, periodically (for example, for every 100 milliseconds). Therefore, when the vehicle communication device 22 receives the roadside unit information from one roadside-unit communication device 32 and detects a receivable timing of the roadside unit information, the vehicle communication device 22 can specify the timing at which all the roadside-unit communication devices 32 transmit the roadside unit information (that is, the receivable timing of the roadside unit information), by counting a system clock or the like thereafter.

The vehicle communication device 22 transmits the vehicle information with an average transmission interval set in advance. However, the vehicle communication device 22 adds random jitters to the transmission interval of the vehicle information (random back-off transmission). Accordingly, the vehicle communication device 22 transmits the vehicle information with the average transmission interval set in advance on average. However, the vehicle communication device 22 changes the transmission interval of individual pieces of vehicle information at random by a minute time. Therefore, even if the vehicle communication device 22 transmits the vehicle information simultaneously with other vehicle communication devices 22, the vehicle communication device 22 can transmit the next vehicle information at a timing different from other vehicle communication devices 22 with a high probability. In this manner, the traffic control system 10 reduces the probability of simultaneous transmission of the vehicle information by two vehicle communication devices 22 continuously for plural times.

Figure 3:
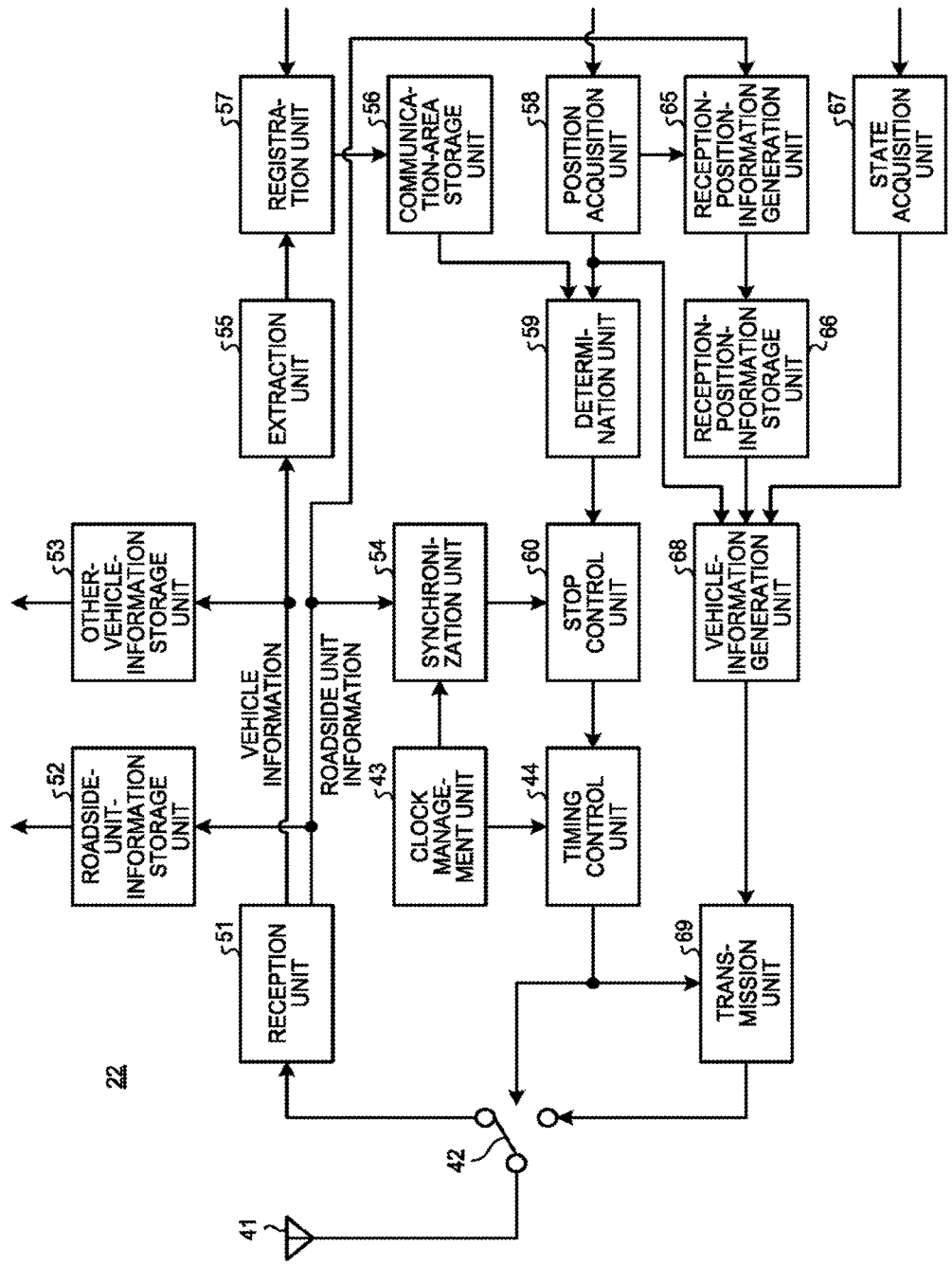
FIG. 3 is a functional configuration diagram of a vehicle communication device according to a first embodiment.

FIG. 3 is a functional configuration diagram of the vehicle communication device 22 according to the first embodiment. The vehicle communication device 22 includes an antenna 41, a switch 42, a clock management unit 43, a timing control unit 44, a reception unit 51, a roadside-unit-information storage unit 52, an other-vehicle-information storage unit 53, a synchronization unit 54, an extraction unit 55, a communication-area storage unit 56, a registration unit 57, a position acquisition unit 58, a determination unit 59, a stop control unit 60, a reception-position-information generation unit 65, a reception-position-information storage unit 66, a state acquisition unit 67, a vehicle-information generation unit 68, and a transmission unit 69.

The antenna 41 emits electronic waves to a predetermined channel. The antenna 41 also acquires the electronic waves that propagate in a predetermined channel.

The switch 42 connects the transmission unit 69 with the antenna 41 at a transmission timing, and causes the signal output from the transmission unit 69 to be sent out to a predetermined channel via the antenna 41. The switch 42 connects the reception unit 51 with the antenna 41 in a reception period (a period other than the transmission timing) to supply the signal acquired from the antenna 41 to the reception unit 51.

The clock management unit 43 generates, for example, a system clock. The timing control unit 44 controls the transmission timing so that the vehicle information is transmitted for every average transmission interval set in advance. Further, the timing control unit 44 adds random jitters to the transmission interval of the vehicle information. For example, the timing control unit 44 adds or subtracts a random time length to or from the average transmission interval set in advance to shift the transmission timing of the individual pieces of vehicle information at random (random back-off transmission). The timing control unit 44 then connects the antenna 41 with the transmission unit 69 at the transmission timing and causes the transmission unit 69 to transmit the vehicle information about the vehicle.

The reception unit 51 receives information from a predetermined channel via the antenna 41 in the period other than the transmission timing designated by the timing control unit 44. The reception unit 51 receives the roadside unit information transmitted to the predetermined channel by the roadside-unit communication device 32 of the roadside unit 30. The reception unit 51 also receives the vehicle information transmitted to the predetermined channel by the vehicle communication device 22 of other vehicles.

The roadside-unit-information storage unit 52 stores therein the roadside unit information received by the reception unit 51. Accordingly, the roadside-unit-information storage unit 52 can provide traffic-light information and the like to the vehicle control device.

The other-vehicle-information storage unit 53 stores therein the vehicle information received by the reception unit 51. Accordingly, the other-vehicle-information storage unit 53 can provide the running state and the like of other vehicles to the vehicle control device.

The synchronization unit 54 performs a synchronization of the reception timing at which the roadside unit information can be received. The roadside-unit communication devices 32 respectively provided in the plurality of roadside units 30 transmit the roadside unit information at the same timing with each other periodically. The synchronization unit 54 detects the reception timing of the roadside unit information, for example, based on the roadside unit information that can be received initially after start of driving of the vehicle 20. The synchronization unit 54 then specifies the timing at which the roadside unit information is transmitted by all the roadside-unit communication devices 32 (that is, the reception timing in which the roadside unit information can be received) thereafter, by counting the system clock generated from the clock management unit 43. The synchronization unit 54 can perform the synchronization for every predetermined period, after start of driving of the vehicle 20.

The extraction unit 55 extracts the reception position information from the vehicle information about other vehicles. The reception position information includes positions at which other vehicles have received the roadside unit information last time and the identification information of the roadside unit 30, being a source of the roadside unit information received by the other vehicles.

The communication-area storage unit 56 stores therein the communication area of the roadside unit 30 for each of the roadside units 30. That is, the communication-area storage unit 56 stores therein a range (a communication area) in which the roadside unit information can be received from the roadside-unit communication device 32 provided in the roadside unit 30, for each of the roadside units 30.

The registration unit 57 registers the communication area of the roadside unit 30 calculated based on the position at which another vehicle has received the roadside unit information in the communication-area storage unit 56. In this case, the registration unit 57 estimates the communication area for each of the roadside units 30, and registers the estimated communication area in association with the roadside unit 30 in the communication-area storage unit 56.

The registration unit 57 acquires, for example, the position where the other vehicle has received the roadside unit information last time and the identification information of the roadside unit 30 being the source of the roadside unit information, based on the reception position information extracted by the extraction unit 55. Subsequently, based on the identification information, the registration unit 57 specifies an installation position of the roadside unit 30. For example, the registration unit 57 provides the identification information or the like to external map information or the like to acquire the installation position of the roadside unit 30. Next, the registration unit 57 estimates the communication area based on the installation position of the roadside unit 30 and the position at which the other vehicle has received the roadside unit information last time. For example, the registration unit 57 calculates the distance between the installation position of the roadside unit 30 and the position at which the other vehicle has received the roadside unit information last time, and estimates a circle having a radius that is the calculated distance and centering on the installation position of the roadside unit 30, as a communication area. Next, the registration unit 57 registers the estimated communication area in the communication-area storage unit 56 in association with the identification information of the roadside unit 30.

There may be a case in which the extraction unit 55 detects the reception position information plural times for the same roadside unit 30. For example, when a plurality of other vehicles have passed the vicinity of the same roadside unit 30, the extraction unit 55 receives the vehicle information from each of other vehicles. In this case, the respective pieces of vehicle information include the reception position information for the same roadside unit 30. Upon extraction of the new reception position information for the same roadside unit 30, the registration unit 57 registers the new communication area in the communication-area storage unit 56 with a condition that the new communication area calculated based on the position indicated in the new reception position information is wider than a registered communication area. Accordingly, the registration unit 57 can register a more accurate communication area in the communication-area storage unit 56.

The position acquisition unit 58 acquires the position of the vehicle. The position acquisition unit 58 acquires the position from the position detection device using, for example, a GPS system provided in the vehicle 20. The position is a latitude and a longitude of the vehicle 20. The position can also include an altitude.

The determination unit 59 determines whether the position of the vehicle acquired by the position acquisition unit 58 is within a communication area of any of the roadside units 30 registered in the communication-area storage unit 56.

The stop control unit 60 stops transmission of the vehicle information based on the determination result of the determination unit 59 and the reception timing of the roadside unit information detected by the synchronization unit 54. Specifically, the stop control unit 60 stops transmission of the vehicle information at the reception timing of the roadside unit information, if the position of the vehicle is within a registered communication area. For example, the stop control unit 60 stops transmission of the vehicle information by controlling the timing control unit 44. Accordingly, the stop control unit 60 can receive the roadside unit information reliably, if the position of the vehicle is within the registered communication area.

The stop control unit 60 does not stop transmission of the vehicle information, if the timing is not the reception timing of the roadside unit information, even if the position of the vehicle is within the registered communication area. Therefore, the transmission unit 69 can transmit the vehicle information about the vehicle at the transmission timing, if it is not the reception timing of the roadside unit information.

When the reception unit 51 has received the roadside unit information, the reception-position-information generation unit 65 acquires the received roadside unit information. Upon acquisition of the roadside unit information, the reception-position-information generation unit 65 acquires the position of the vehicle at the time of receiving the roadside unit information from the roadside unit 30 from the position acquisition unit 58. Subsequently, the reception-position-information generation unit 65 generates the reception position information including the position of the vehicle at the time of receiving the roadside unit information from the roadside unit 30 last time and the identification information of the roadside unit 30 being the source of the roadside unit information. The reception-position-information generation unit 65 then registers the generated reception position information in the reception-position-information storage unit 66.

The reception-position-information storage unit 66 stores therein the reception position information generated by the reception-position-information generation unit 65. When the reception-position-information generation unit 65 generates the new reception position information, the reception-position-information storage unit 66 overwrites the reception position information with the new reception position information and stores the overwritten reception position information therein.

The state acquisition unit 67 acquires the running state of the vehicle. The running state of the vehicle is, for example, whether the vehicles 20 is stopping or moving, the moving speed, acceleration, and moving direction, and the like. The state acquisition unit 67 acquires, for example, the running state from the vehicle control device.

The vehicle-information generation unit 68 generates the vehicle information about the vehicle. The vehicle-information generation unit 68 generates the vehicle information including, for example, the running state of the vehicle acquired by the state acquisition unit 67, the position of the vehicle acquired by the position acquisition unit 58, and the reception position information stored in the reception-position-information storage unit 66.

The transmission unit 69 transmits the vehicle information about the vehicle generated by the vehicle-information generation unit 68 to a predetermined channel via the antenna 41, at the transmission timing designated by the timing control unit 44.

In the example described above, the reception-position-information generation unit 65 generates the reception position information including the position of the vehicle at the time of receiving the roadside unit information from the roadside unit 30 last time. Instead of doing this, the reception-position-information generation unit 65 can calculate the communication area of the roadside unit 30 based on the position of the vehicle at the time of receiving the roadside unit information from the roadside unit 30 last time to generate the reception position information including the calculated communication area. In this case, the reception-position-information generation unit 65 calculates the communication area in the same manner as that of the registration unit 57. Further, in this case, the reception position information extracted by the extraction unit 55 includes the communication area and the identification information of the roadside unit 30. Therefore, the registration unit 57 registers the communication area and the identification information included in the reception position information in the communication-area storage unit 56.

Figure 4:
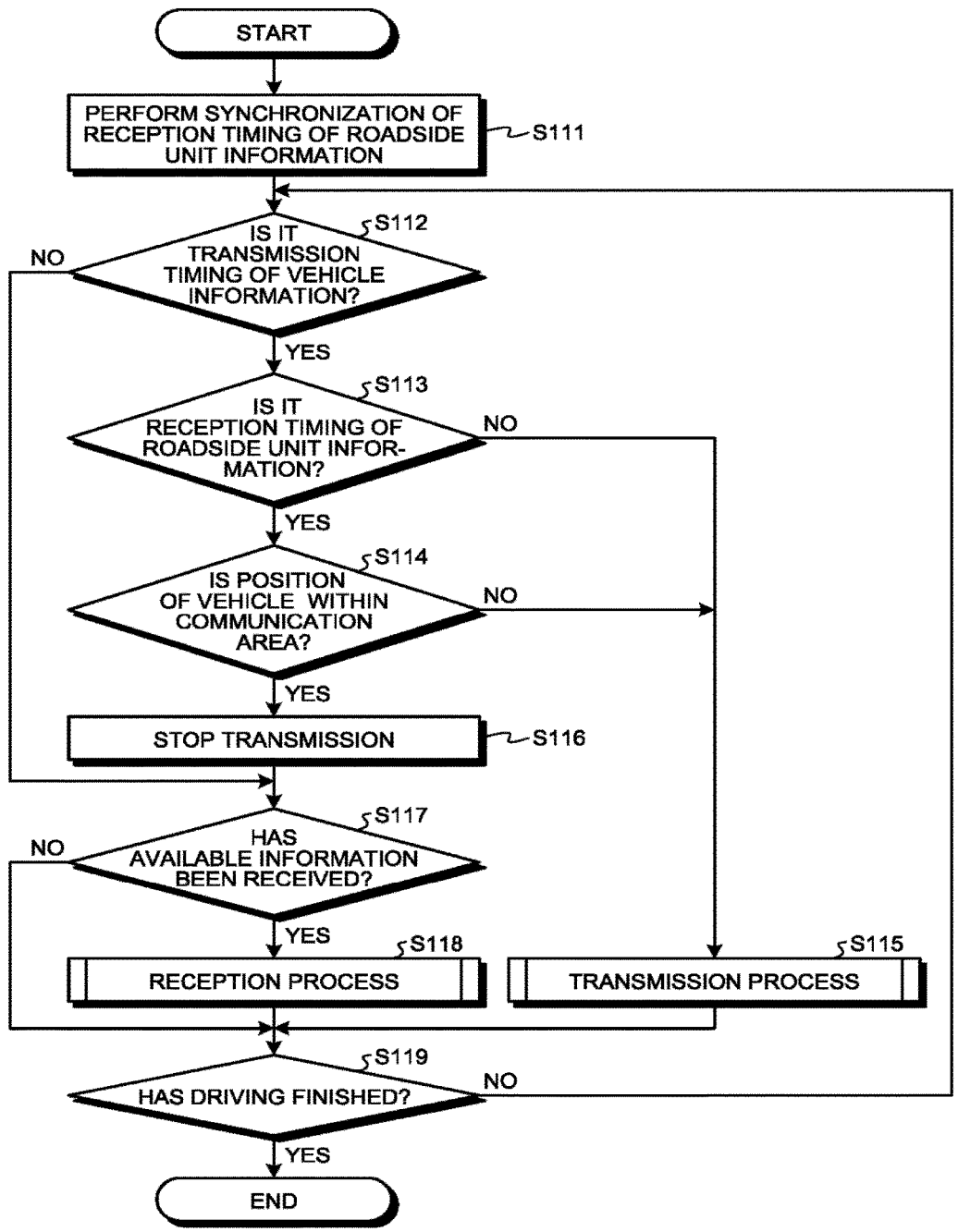
FIG. 4 is a flowchart of processes of the vehicle communication device according to the first embodiment.

FIG. 4 is a flowchart illustrating a processing flow of the vehicle communication device 22 according to the first embodiment. The vehicle communication device 22 performs the process according to the flow illustrated in FIG. 4, after start of driving of the vehicle.

First, at S111, the vehicle communication device 22 performs a synchronization of a reception timing of the roadside unit information. For example, the vehicle communication device 22 detects the reception timing of the roadside unit information based on the roadside unit information having received initially after start of driving of the vehicle 20, and specifies the reception timing thereafter after counting the system clock based on the detected reception timing. The vehicle communication device 22 can perform the subsequent process in a state in which there is no reception timing of the roadside unit information until the first roadside unit information can be received, and perform the process at S111 after the roadside unit information can be received first time. Further, the vehicle communication device 22 can specify the reception timing of the roadside unit information based on the reception timing detected during the past driving operation and absolute time information, until the first roadside unit information can be received.

Subsequently, at S112, the vehicle communication device 22 determines whether it is a transmission timing of the vehicle information about the vehicle. If it is not the transmission timing of the vehicle information about the vehicle (NO at S112), the vehicle communication device 22 forwards the process to S117.

If it is the transmission timing of the vehicle information about the vehicle (YES at S112), the vehicle communication device 22 forwards the process to S113. At S113, the vehicle communication device 22 determines whether it is the reception timing of the roadside unit information. If it is the reception timing of the roadside unit information (YES at S113), the vehicle communication device 22 forwards the process to S114. If it is not the reception timing of the roadside unit information (NO at S113), the vehicle communication device 22 forwards the process to S115.

At S114, the vehicle communication device 22 determines whether the position of the vehicle is within the registered communication area. If the position of the vehicle is not within the registered communication area (NO at S114), the vehicle communication device 22 forwards the process to S115.

At S115, the vehicle communication device 22 performs a transmission process. The transmission process is described later with reference to FIG. 6. When the transmission process has finished, the vehicle communication device 22 forwards the process to S119.

Even at the transmission timing of the vehicle information (YES at S112), if it is a reception timing of the roadside unit information (YES at S113), and the position of the vehicles is within the registered communication area (YES at S114), the vehicle communication device 22 forwards the process to S116. At S116, the vehicle communication device 22 performs a transmission stopping process. The vehicle communication device 22 then forwards the process to S117, after execution of the process at Step S116.

At S117, the vehicle communication device 22 determines whether available information has been able to be received. For example, the vehicle communication device 22 determines whether a signal having a strength equal to or higher than a predetermined strength has been able to be received. If the available information has not been able to be received (NO at S117), the vehicle communication device 22 forwards the process to S119. If the available information has been able to be received (YES at S117), the vehicle communication device 22 forwards the process to S118. At S118, the vehicle communication device 22 performs a reception process. The reception process is described later with reference to FIG. 5. When the reception process has finished, the vehicle communication device 22 forwards the process to S119.

As described above, if it is the reception timing of the roadside unit information (YES at S113), and the position of the vehicle is within the communication area (YES at S114), the vehicle communication device 22 can stop transmission of the vehicle information about the vehicle and perform the reception process.

At S119, the vehicle communication device 22 determines whether driving has finished. If driving has finished (YES at S119), the vehicle communication device 22 finishes this flow. If driving has not finished (NO at S119), the vehicle communication device 22 returns the process to S112 to repeat the process from S112.

Figure 5:
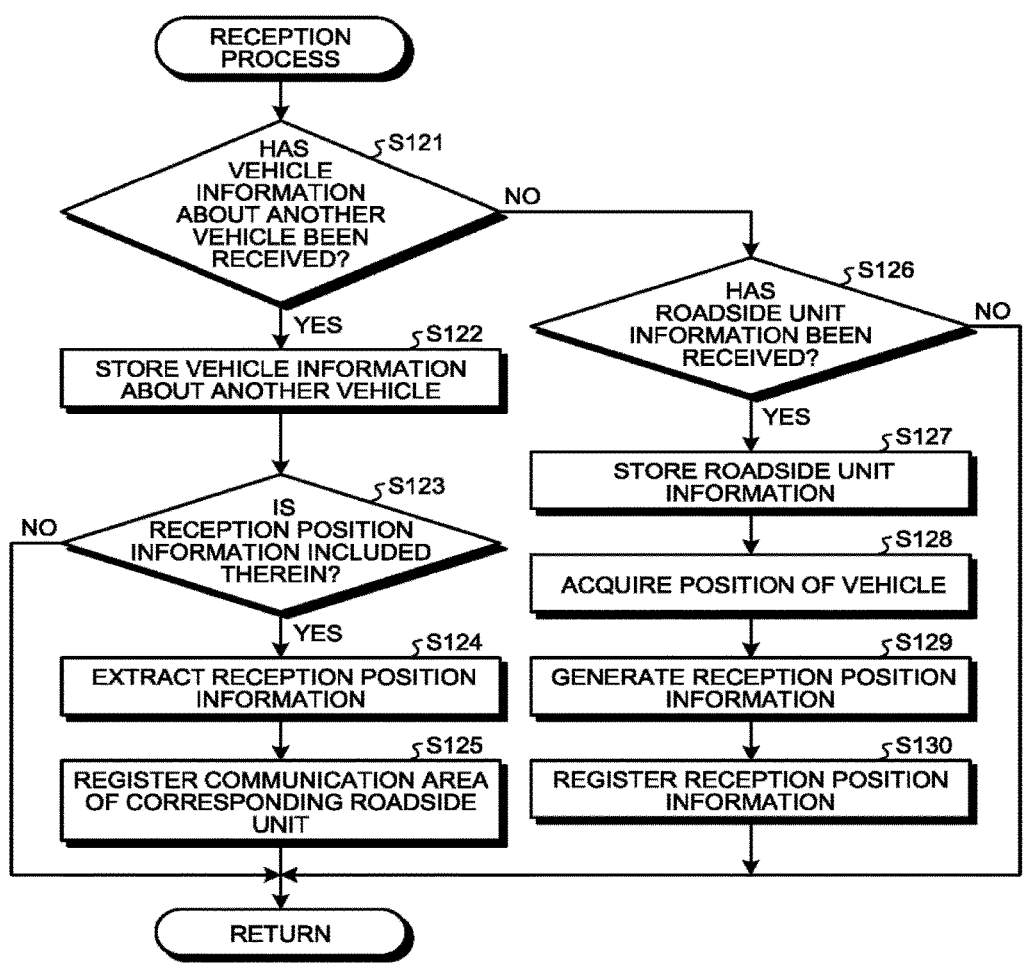
FIG. 5 is a flowchart of a reception process in the vehicle communication device according to the first embodiment.

FIG. 5 is a flowchart illustrating a reception process in the vehicle communication device 22 according to the first embodiment. The vehicle communication device 22 performs the process according to the flow illustrated in FIG. 5, at S118 in FIG. 4.

First, at S121, the vehicle communication device 22 determines whether vehicle information about other vehicles has been received. If the vehicle information about the other vehicles has been received (YES at S121), the vehicle communication device 22 forwards the process to S122.

At S122, the vehicle communication device 22 stores the received vehicle information about the other vehicles. Subsequently, at S123, the vehicle communication device 22 determines whether the reception position information is included in the vehicle information about the other vehicles. If the reception position information is not included in the vehicle information about the other vehicles (NO at S123), the vehicle communication device 22 finishes this flow, and returns to the process in FIG. 4.

If the reception position information is included in the vehicle information about the other vehicles (YES at S123), the vehicle communication device 22 forwards the process to S124. At S124, the vehicle communication device 22 extracts the reception position information. Subsequently, at S125, the vehicle communication device 22 estimates the communication area of the roadside-unit communication device 32 of the corresponding roadside unit 30 based on the reception position information, and registers the estimated communication area in the communication-area storage unit 56 as the communication area of the corresponding roadside unit 30. When the process at S125 is finished, the vehicle communication device 22 finishes this flow, and returns to the process in FIG. 4.

On the other hand, if the vehicle information about the other vehicles has not been received (NO at S121), the vehicle communication device 22 determines whether the roadside unit information has been received at S126. If the roadside unit information has been received (YES at S126), the vehicle communication device 22 forwards the process to S127. If the roadside unit information has not been received (NO at S126), the vehicle communication device 22 finishes this flow, and returns to the process in FIG. 4.

At S127, the vehicle communication device 22 stores the received roadside unit information therein. Subsequently, at S128, the vehicle communication device 22 acquires the position of the vehicle. At S129, the vehicle communication device 22 generates the reception position information. Next, at S130, the vehicle communication device 22 registers the generated reception position information in the reception-position-information storage unit 66. When the process at S130 has finished, the vehicle communication device 22 finishes this flow, and returns to the process in FIG. 4.

Figure 6:
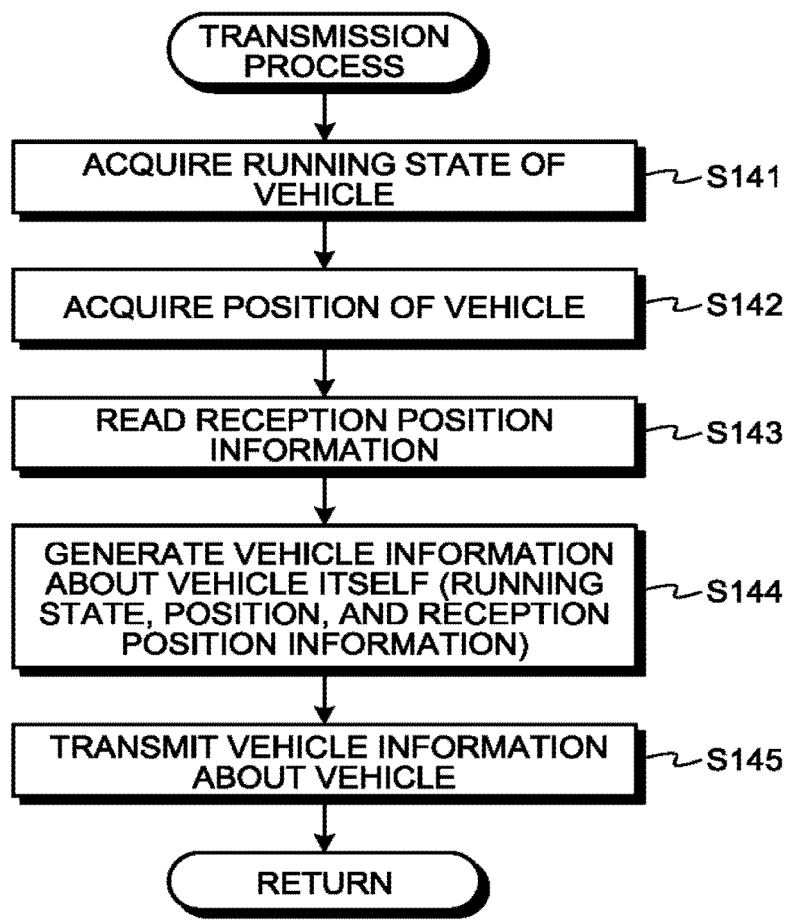
FIG. 6 is a flowchart of a transmission process in the vehicle communication device according to the first embodiment.

FIG. 6 is a flowchart illustrating a flow of the transmission process in the vehicle communication device 22 according to the first embodiment. The vehicle communication device 22 performs the process according to the flow illustrated in FIG. 6 at S115 in FIG. 4.

First, at S141, the vehicle communication device 22 acquires the running state of the vehicle. Subsequently, at S142, the vehicle communication device 22 acquires the position of the vehicle.

Next, at S143, the vehicle communication device 22 reads the reception position information stored in the reception-position-information storage unit 66. At the time of reception of the roadside unit information, the vehicle communication device 22 has generated the reception position information and stored the reception position information in the reception-position-information storage unit 66.

Subsequently, at S144, the vehicle communication device 22 generates the vehicle information about the vehicle. More specifically, the vehicle communication device 22 generates the vehicle information including the running state of the vehicle, the position of the vehicle, and the reception position information. Next, at S145, the vehicle communication device 22 transmits the vehicle information about the vehicle to a predetermined channel. When the process at S145 is finished, the vehicle communication device 22 finishes this flow, and returns to the process in FIG. 4.

An example of a scenario performed by the traffic control system 10 according to the first embodiment is described with reference to FIGS. 7, 8, and 9.

Figure 7:
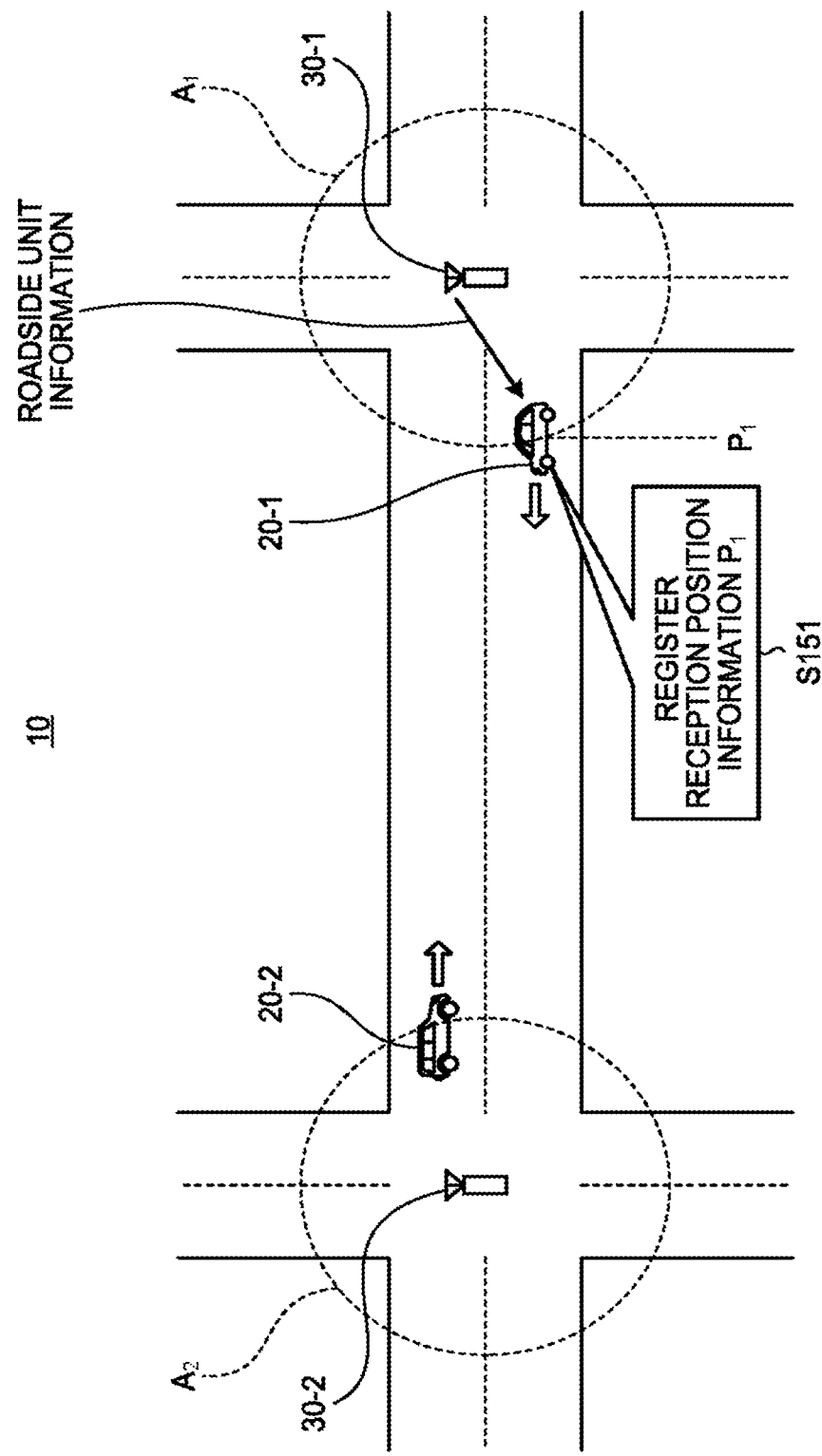
FIG. 7 is an explanatory diagram of a first process in a scenario performed in the first embodiment.

First, as illustrated in FIG. 7, it is assumed that a first vehicle 20-1 has passed a communication area $A_1$ of a first roadside unit 30-1. In this case, the first vehicle 20-1 receives the roadside unit information from the first roadside unit 30-1 at a timing immediately before moving out of the communication area $A_1$. The first vehicle 20-1 then registers therein reception position information $P_1$ indicating the position at the timing when the roadside unit information has been received last time (S151).

Figure 8:
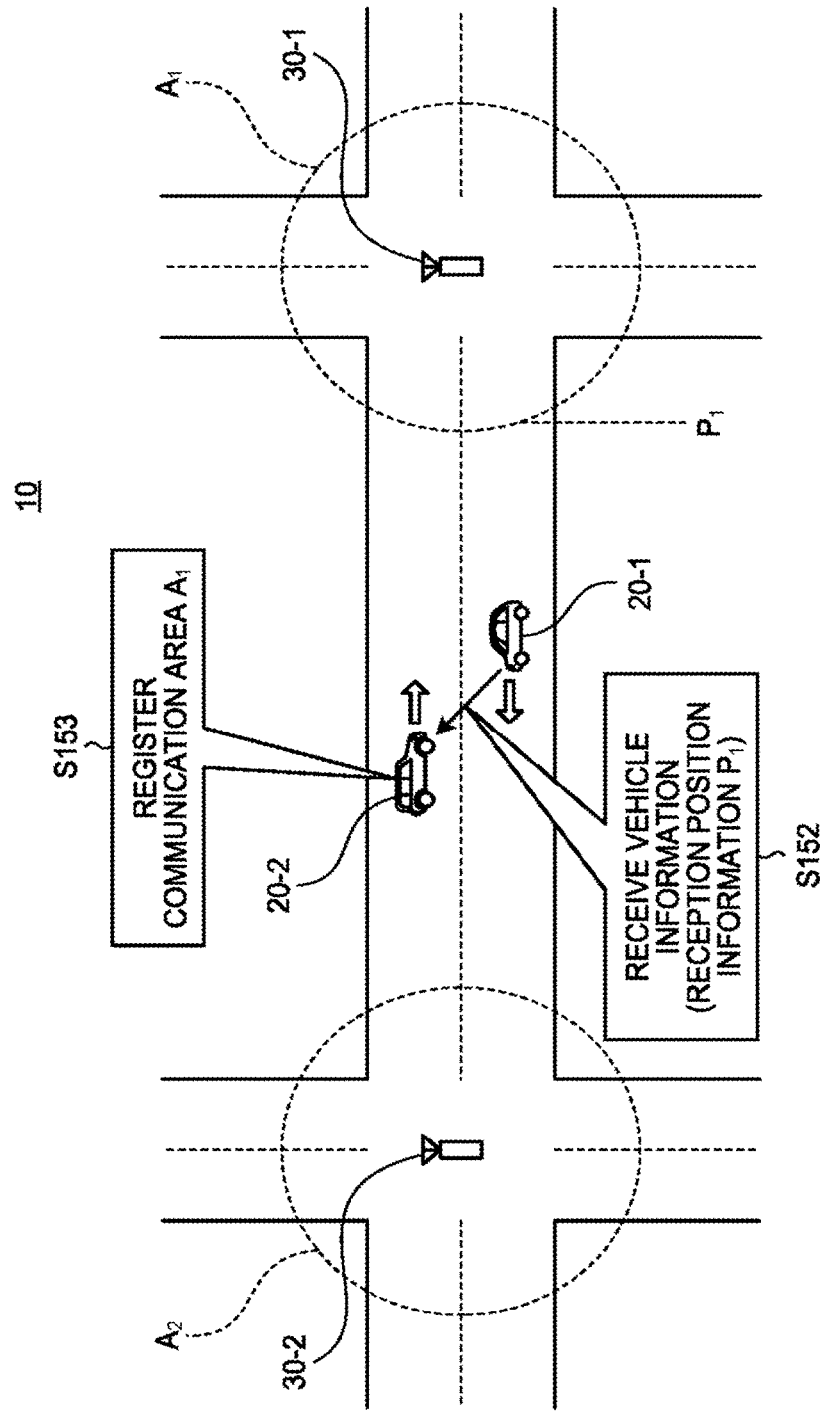
FIG. 8 is an explanatory diagram of a second process in a scenario performed in the first embodiment.

Subsequently, as illustrated in FIG. 8, it is assumed that the first vehicle 20-1 has passed a second vehicle 20-2 running in an oncoming lane before reaching a communication area $A_2$ of a second roadside unit 30-2. At this time, the second vehicle 20-2 receives the vehicle information about the first vehicle 20-1 from the first vehicle 20-1 (S152). The vehicle information about the first vehicle 20-1 includes the reception position information $P_1$ indicating the position at which the first vehicle 20-1 has received the roadside unit information last time from the first roadside unit 30-1.

Upon reception of the vehicle information from the first vehicle 20-1, the second vehicle 20-2 extracts the reception position information $P_1$ included in the received vehicle information. The second vehicle 20-2 estimates the communication area $A_1$ of the first roadside unit 30-1 based on the reception position information $P_1$, and registers therein the estimated communication area $A_1$ (S153).

Figure 9:
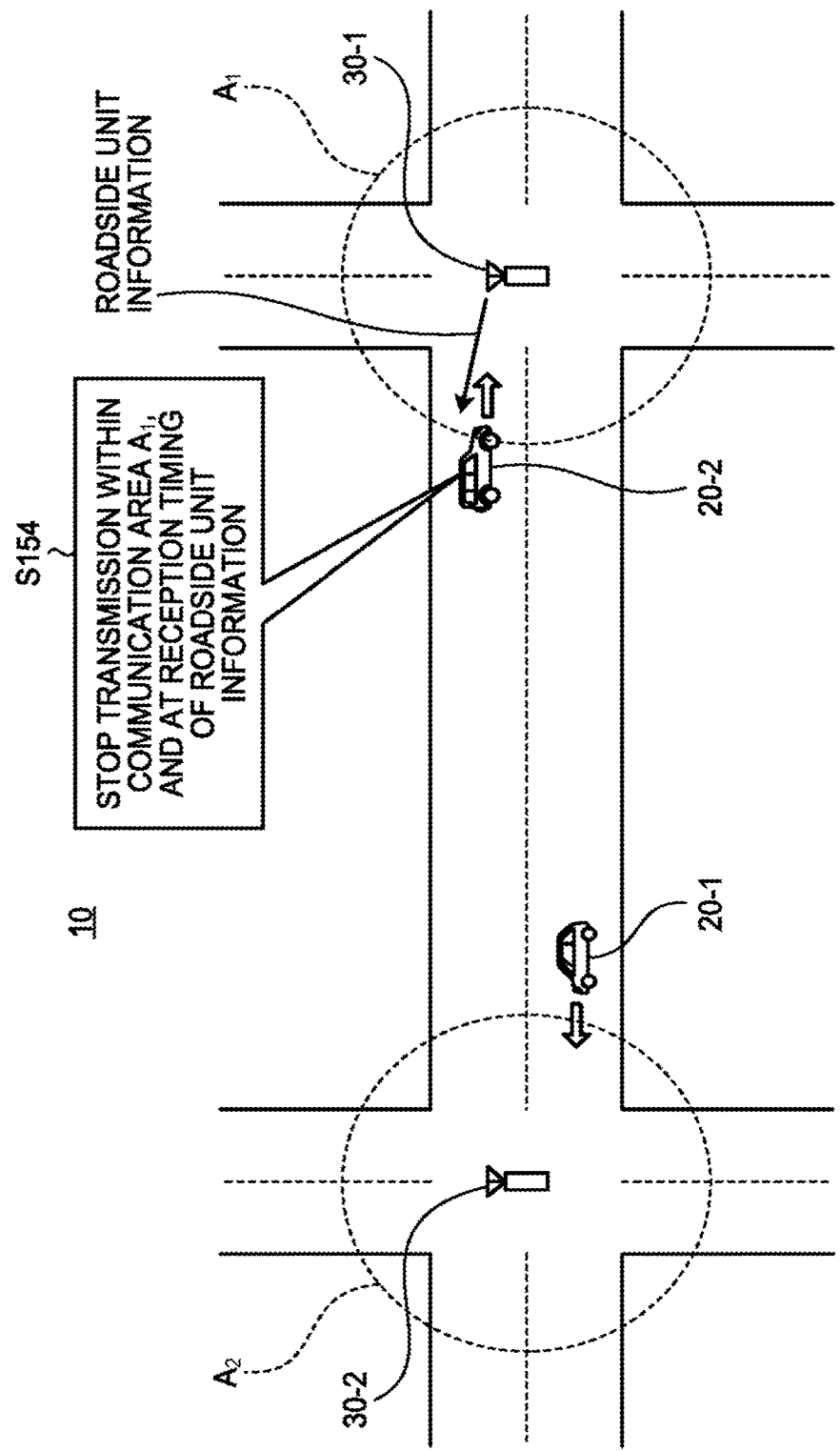
FIG. 9 is an explanatory diagram of a third process in a scenario performed in the first embodiment.

Subsequently, as illustrated in FIG. 9, it is assumed that the second vehicle 20-2 has reached inside the communication area $A_1$ of the first roadside unit 30-1. At this time, the second vehicle 20-2 forcibly stops transmission of the vehicle information when the position of the vehicle is within the communication area $A_1$ of the first roadside unit 30-1 and at the communication timing of the roadside unit information (S154).

Upon forcibly stopping the transmission of the vehicle information, the second vehicle 20-2 becomes a signal reception stand-by state. Accordingly, the second vehicle 20-2 can receive the roadside unit information in the communication area $A_1$ of the first roadside unit 30-1 reliably. Further, the second vehicle 20-2 can receive the roadside unit information at the earliest stage after having reached the communication area $A_1$ of the first roadside unit 30-1.

As described above, the vehicle 20 according to the first embodiment registers therein the communication area of the roadside unit 30 through which the vehicle 20 will pass in the future, based on the vehicle information received from other vehicles. When entering into the communication area of the roadside unit 30, the vehicle 20 according to the first embodiment stops the vehicle information to be transmitted by the vehicle at the reception timing of the roadside unit information. Accordingly, the vehicle 20 can receive the roadside unit information transmitted from the roadside unit 30 reliably and more quickly.

Second Embodiment

The traffic control system 10 according to a second embodiment is described next. Because the traffic control system 10 according to the second embodiment is substantially identical to that according to the first embodiment, differences therebetween are mainly described.

Figure 10:
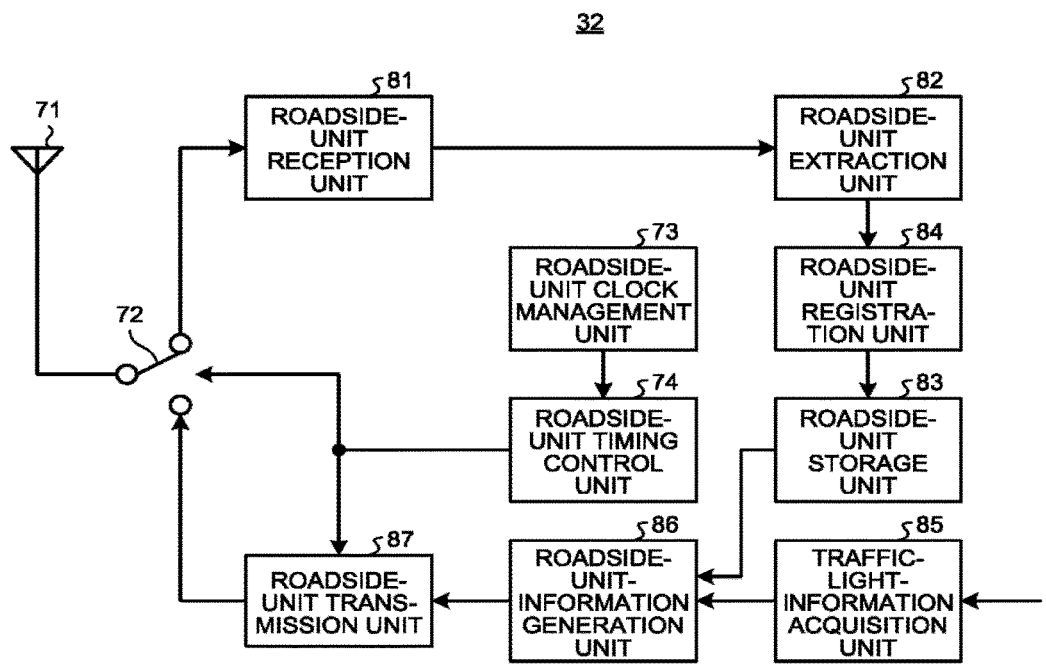
FIG. 10 is a functional configuration diagram of a roadside-unit communication device according to a second embodiment.

FIG. 10 is a functional configuration diagram of the roadside-unit communication device 32 according to the second embodiment. The roadside-unit communication device 32 includes a roadside-unit antenna 71, a roadside-unit switch 72, a roadside-unit clock management unit 73, a roadside-unit timing control unit 74, a roadside-unit reception unit 81, a roadside-unit extraction unit 82, a roadside-unit storage unit 83, a roadside-unit registration unit 84, a traffic-light-information acquisition unit 85, a roadside-unit-information generation unit 86, and a roadside-unit transmission unit 87.

The roadside-unit antenna 71 emits electronic waves to a predetermined channel. The roadside-unit antenna 71 also acquires the electronic waves that propagate in the predetermined channel.

The roadside-unit switch 72 connects the roadside-unit transmission unit 87 with the roadside-unit antenna 71 at a transmission timing, and causes the signal output from the roadside-unit transmission unit 87 to be sent out to the predetermined channel via the roadside-unit antenna 71. The roadside-unit switch 72 connects the roadside-unit reception unit 81 with the roadside-unit antenna 71 in a reception period (a period other than the transmission timing) to supply the signal acquired from the roadside-unit antenna 71 to the roadside-unit reception unit 81.

The roadside-unit clock management unit 73 generates, for example, a system clock. The roadside-unit timing control unit 74 controls the transmission timing so that the vehicle information is transmitted at every preset interval. In the roadside unit 30, the transmission timing is the same in the roadside-unit communication devices 32 provided in all the roadside units 30. That is, the roadside-unit communication device 32 provided in all the roadside units 30 transmit a signal at the same timing. The roadside-unit timing control unit 74 connects the roadside-unit antenna 71 with the roadside-unit transmission unit 87 at the transmission timing and causes the roadside-unit transmission unit 87 to transmit the roadside unit information.

The roadside-unit reception unit 81 receives information from the predetermined channel via the roadside-unit antenna 71 in a period other than the transmission timing designated by the roadside-unit timing control unit 74. The roadside-unit reception unit 81 receives the vehicle information transmitted by the vehicle communication device 22 of the vehicle 20 passing the communication area to the predetermined channel.

The roadside-unit extraction unit 82 extracts the reception position information from the received vehicle information. The reception position information includes a position at which the vehicle 20 has received the roadside unit information transmitted from another roadside unit 30 last time and the identification information of the roadside unit 30, being a source of the roadside unit information.

The roadside-unit storage unit 83 stores therein the reception position information for each of the roadside units 30. The roadside-unit registration unit 84 registers the reception position information extracted by the roadside-unit extraction unit 82 in the roadside-unit storage unit 83 for each of the roadside units 30.

If the roadside-unit extraction unit 82 has extracted new reception position information for the roadside unit 30, whose reception position information has been already registered, the roadside-unit registration unit 84 can overwrite the reception position information already registered with the new reception position information. Instead of doing this, the roadside-unit registration unit 84 can overwrite the reception position information already registered with the new reception position information, under a condition that the communication area to be generated based on the new reception position information is wider than the communication area to be generated based on the reception position information already registered. In this case, the roadside-unit registration unit 84 calculates a distance between the installation position of the roadside unit 30 and the reception position as the communication area. Accordingly, the roadside-unit registration unit 84 can register the more accurate reception position information in the roadside-unit storage unit 83.

The traffic-light-information acquisition unit 85 acquires traffic-light information. The traffic-light information represents display contents of the traffic light at an intersection. The traffic-light information is represented by a pair of display contents that the traffic light is displaying (a stopping instruction, a running instruction, or the like), and a running direction (orientation) of the vehicle 20 to which a command is to be provided. If there are traffic lights with respect to vehicles 20 in a plurality of running directions, the roadside unit information includes the traffic-light information for each of the traffic lights. Further, the traffic-light information can include a remaining time until the display contents is changed to the next content.

The roadside-unit-information generation unit 86 generates the roadside unit information. The roadside unit information includes the traffic-light information acquired by the traffic-light-information acquisition unit 85, and the reception position information stored in the roadside-unit storage unit 83.

The roadside-unit transmission unit 87 transmits the roadside unit information generated by the roadside-unit-information generation unit 86 to the predetermined channel via the roadside-unit antenna 71 at the transmission timing designated by the roadside-unit timing control unit 74.

Figure 11:
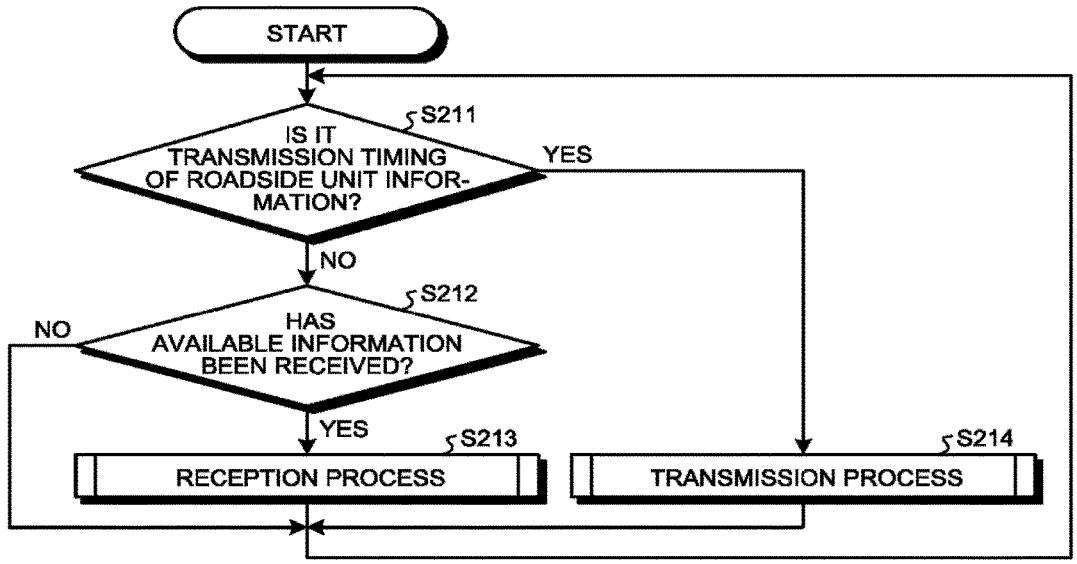
FIG. 11 is a flowchart of processes of the roadside-unit communication device according to the second embodiment.

FIG. 11 is a flowchart illustrating a processing flow of the roadside-unit communication device 32 according to the second embodiment. The roadside-unit communication device 32 performs the process according to the flow illustrated in FIG. 11.

First, at S211, the roadside-unit communication device 32 determines whether it is a transmission timing of the roadside unit information. If it is not the transmission timing of the roadside unit information (NO at S211), the roadside-unit communication device 32 forwards the process to S212. At S212, the roadside-unit communication device 32 determines whether available information has been able to be received. For example, the roadside-unit communication device 32 determines whether a signal having a strength equal to or higher than a predetermined strength has been able to be received. If available information has not been able to be received (NO at S212), the roadside-unit communication device 32 returns the process to S211. If available information has been able to be received (YES at S212), the roadside-unit communication device 32 forwards the process to S213.

At S213, the roadside-unit communication device 32 performs a reception process. The reception process is described later with reference to FIG. 12. If the reception process has finished, the roadside-unit communication device 32 returns the process to S211.

On the other hand, if it is the transmission timing of the roadside unit information (YES at S211), the roadside-unit communication device 32 forwards the process to S214. At S214, the roadside-unit communication device 32 performs a transmission process. The transmission process is described later with reference to FIG. 13. If the transmission process has finished, the roadside-unit communication device 32 returns the process to S211. The roadside-unit communication device 32 continues to perform the processes from S211 to S214 repeatedly, while the roadside unit 30 is operating continuously.

FIG. 12 is a flowchart illustrating a flow of the reception process in the roadside-unit communication device 32 according to the second embodiment. The roadside-unit communication device 32 performs the process according to the flow illustrated in FIG. 12 at S213 in FIG. 11.

First, at S221, the roadside-unit communication device 32 determines whether the vehicle information has been received from the vehicle 20. If the vehicle information has not been received (NO at S221), the roadside-unit communication device 32 finishes the flow, and returns to the process in FIG. 11. If the vehicle information has been received (YES at S221), the roadside-unit communication device 32 forwards the process to S222.

At S222, the roadside-unit communication device 32 determines whether the reception position information is included in the received vehicle information. If the reception position information is not included in the received vehicle information (NO at S222), the roadside-unit communication device 32 finishes the flow, and returns to the process in FIG. 11.

If the reception position information is included in the received vehicle information (YES at S222), the roadside-unit communication device 32 extracts the reception position information from the received vehicle information at S223. Subsequently, at S224, the roadside-unit communication device 32 registers the reception position information in the roadside-unit storage unit 83. When the process at S224 is finished, the roadside-unit communication device 32 finishes this flow, and returns to the process in FIG. 11.

FIG. 13 is a flowchart illustrating a flow of the transmission process in the roadside-unit communication device 32 according to the second embodiment. At S214 in FIG. 11, the roadside-unit communication device 32 performs the process according to the flow illustrated in FIG. 13.

First, at S231, the roadside-unit communication device 32 acquires the traffic-light information. Subsequently, at S232, the roadside-unit communication device 32 reads the reception position information of another roadside unit 30, which has been registered in the roadside-unit storage unit 83. The roadside-unit communication device 32 has extracted the reception position information and registered the reception position information in the roadside-unit storage unit 83 at the time of reception of the vehicle information.

Next, at S233, the roadside-unit communication device 32 generates the roadside unit information. More specifically, the roadside-unit communication device 32 generates the vehicle information including the traffic-light information and the reception position information. Next, at S234, the roadside-unit communication device 32 transmits the roadside unit information to a predetermined channel. When the process at S234 is finished, the roadside-unit communication device 32 finishes the flow, and returns to the process in FIG. 11.

Figure 14:
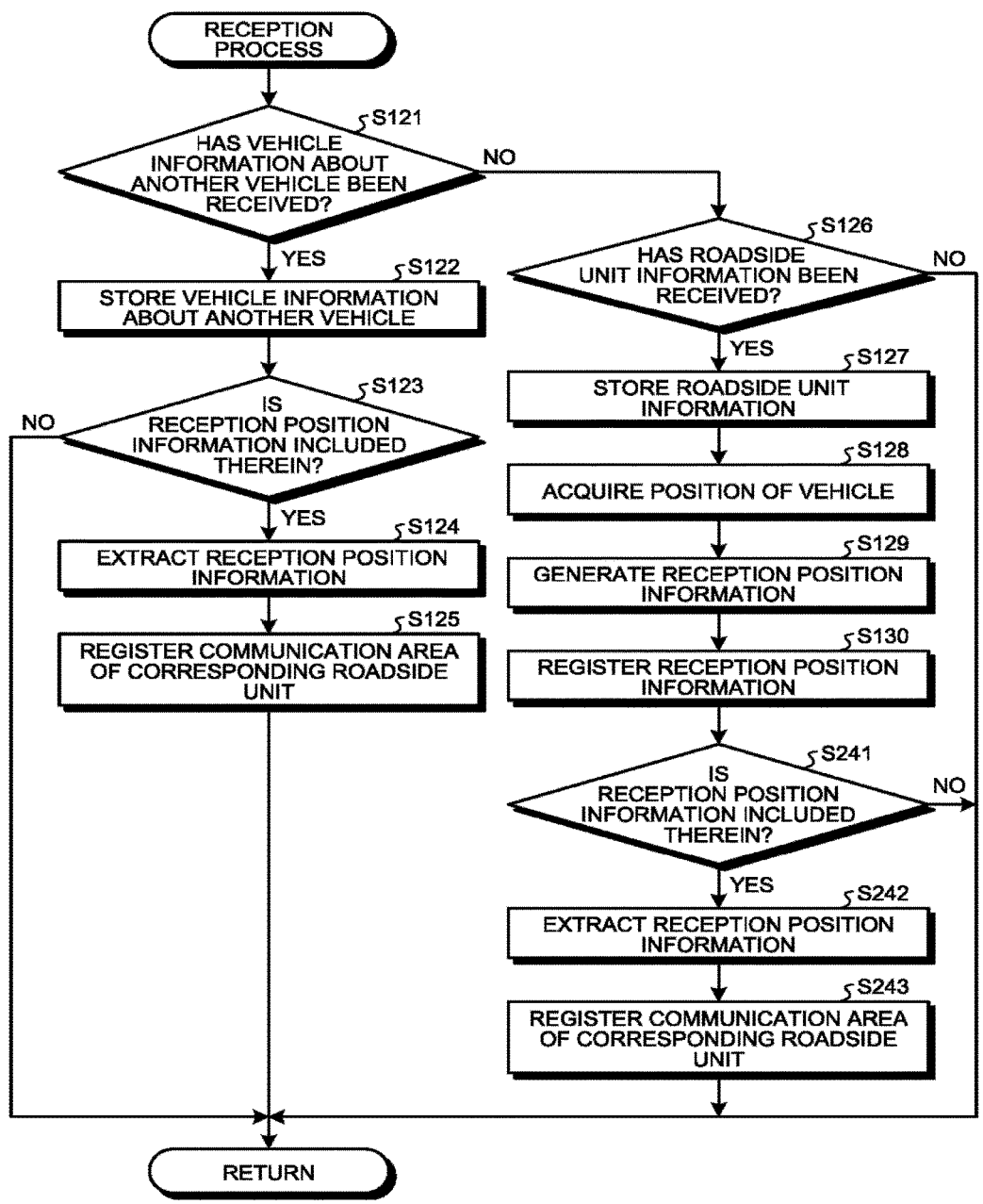
FIG. 14 is a flowchart of processes of a vehicle communication device according to the second embodiment.

FIG. 14 is a flowchart illustrating a flow of the reception process in the vehicle communication device 22 according to the second embodiment. At S118 in FIG. 4, the vehicle communication device 22 according to the second embodiment performs the process according to the flow illustrated in FIG. 14.

While the reception process in the vehicle communication device 22 according to the second embodiment is different from the flow illustrated in FIG. 5 in that the processes at S241 to S243 are added, other processes are same as those in FIG. 5. The processes at S241 to S243 are described below.

After the vehicle communication device 22 has registered the reception position information in the reception-position-information storage unit 66 at Step S130, the vehicle communication device 22 forwards the process to S241. At S241, the vehicle communication device 22 determines whether the reception position information of another roadside unit 30 is included in the received roadside unit information. If the reception position information of the other roadside unit 30 is not included therein (NO at S241), the vehicle communication device 22 finishes the flow, and returns to the process in FIG. 4.

If the reception position information of the other roadside unit 30 is included therein (YES at S241), the vehicle communication device 22 extracts the reception position information from the received roadside unit information at S242. Subsequently, at S243, the vehicle communication device 22 estimates a communication area of the roadside-unit communication device 32 of the corresponding roadside unit 30 based on the extracted reception position information, and registers the communication area in the communication-area storage unit 56 as the communication area of the corresponding roadside unit 30. When the process at S243 has been finished, the vehicle communication device 22 finishes the flow, and returns to the process in FIG. 4.

An example of a scenario performed by the traffic control system 10 according to the second embodiment is described with reference to FIGS. 15, 16, 17, and 18.

Figure 15:
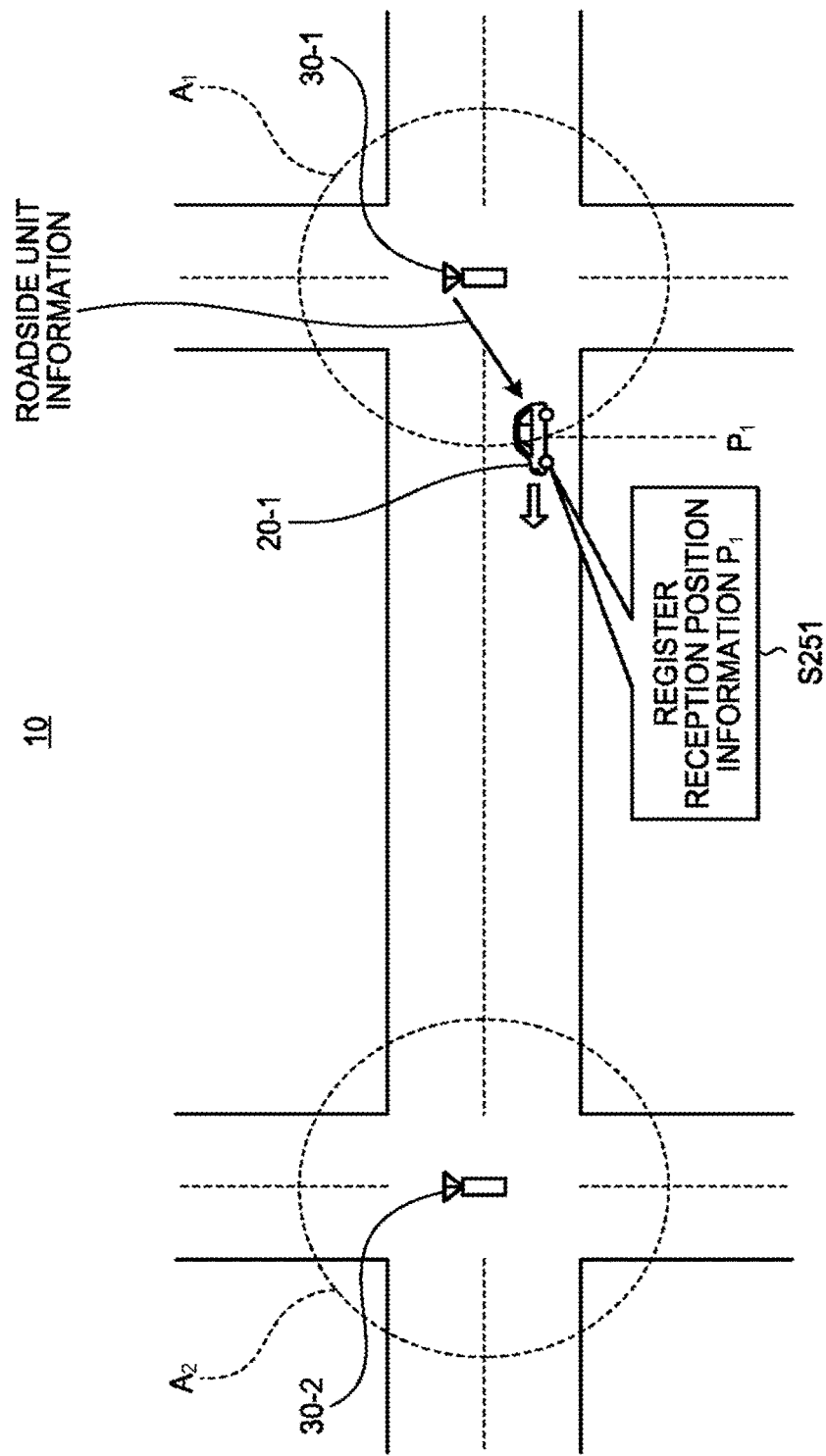
FIG. 15 is an explanatory diagram of a first process in a scenario performed in the second embodiment.

First, as illustrated in FIG. 15, it is assumed that the first vehicle 20-1 has passed the communication area $A_1$ of the first roadside unit 30-1. The first vehicle 20-1 receives the roadside unit information from the first roadside unit 30-1 at a timing immediately before moving out of the communication area $A_1$. The first vehicle 20-1 registers therein reception position information $P_1$ indicating the position at the timing when the roadside unit information has been received (S251).

Figure 16:
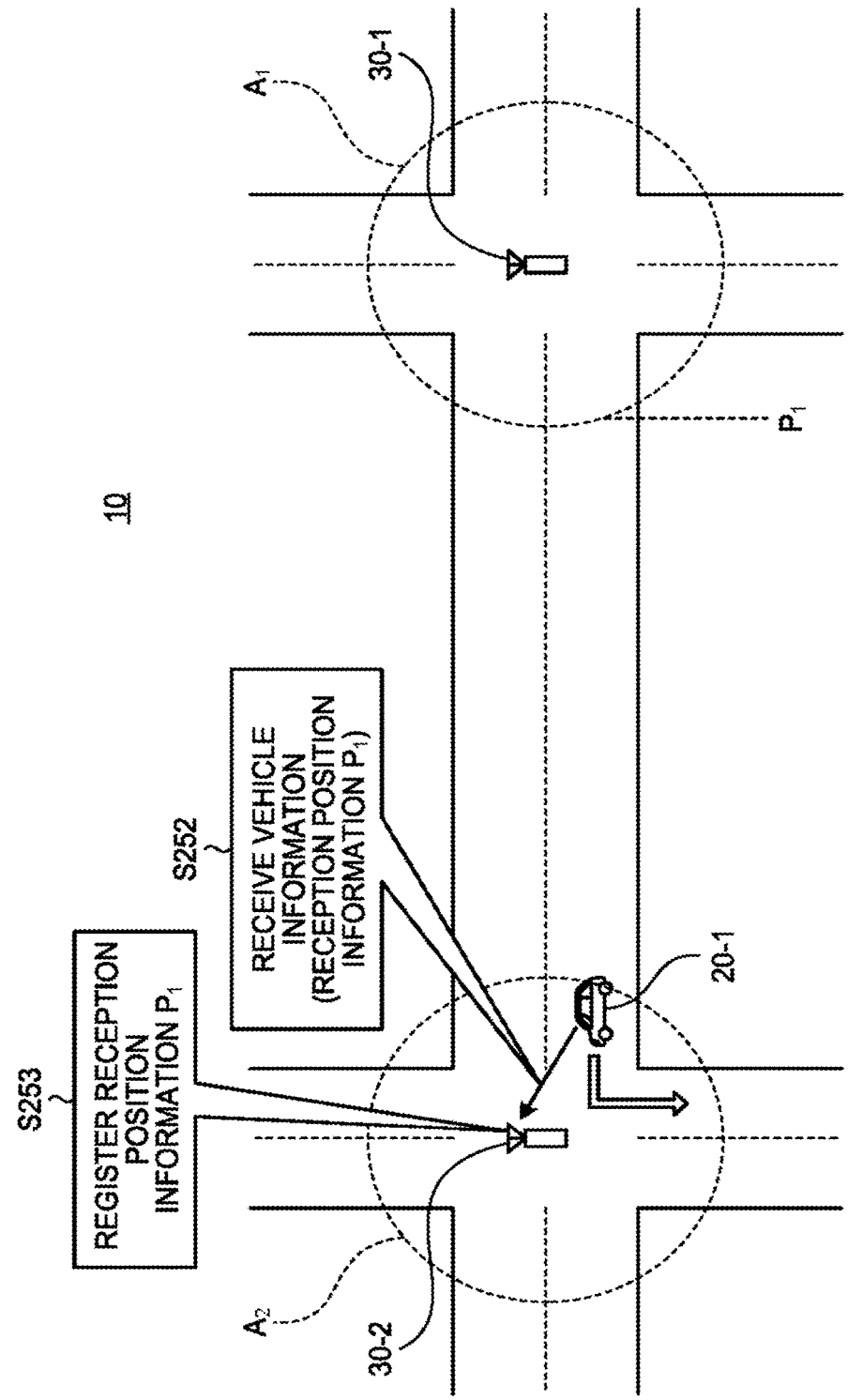
FIG. 16 is an explanatory diagram of a second process in a scenario performed in the second embodiment.

Next, as illustrated in FIG. 16, it is assumed that the first vehicle 20-1 has reached a communication area $A_2$ of a second roadside unit 30-2. At this time, the second roadside unit 30-2 receives the vehicle information about the first vehicle 20-1 from the first vehicle 20-1 (S252). The vehicle information about the first vehicle 20-1 includes the reception position information $P_1$ indicating the position when the first vehicle 20-1 has received the roadside unit information last time from the first roadside unit 30-1.

Subsequently, upon reception of the vehicle information from the first vehicle 20-1, the second roadside unit 30-2 extracts the reception position information $P_1$ included in the received vehicle information. The second roadside unit 30-2 registers therein the reception position information $P_1$ (S253).

Figure 17:
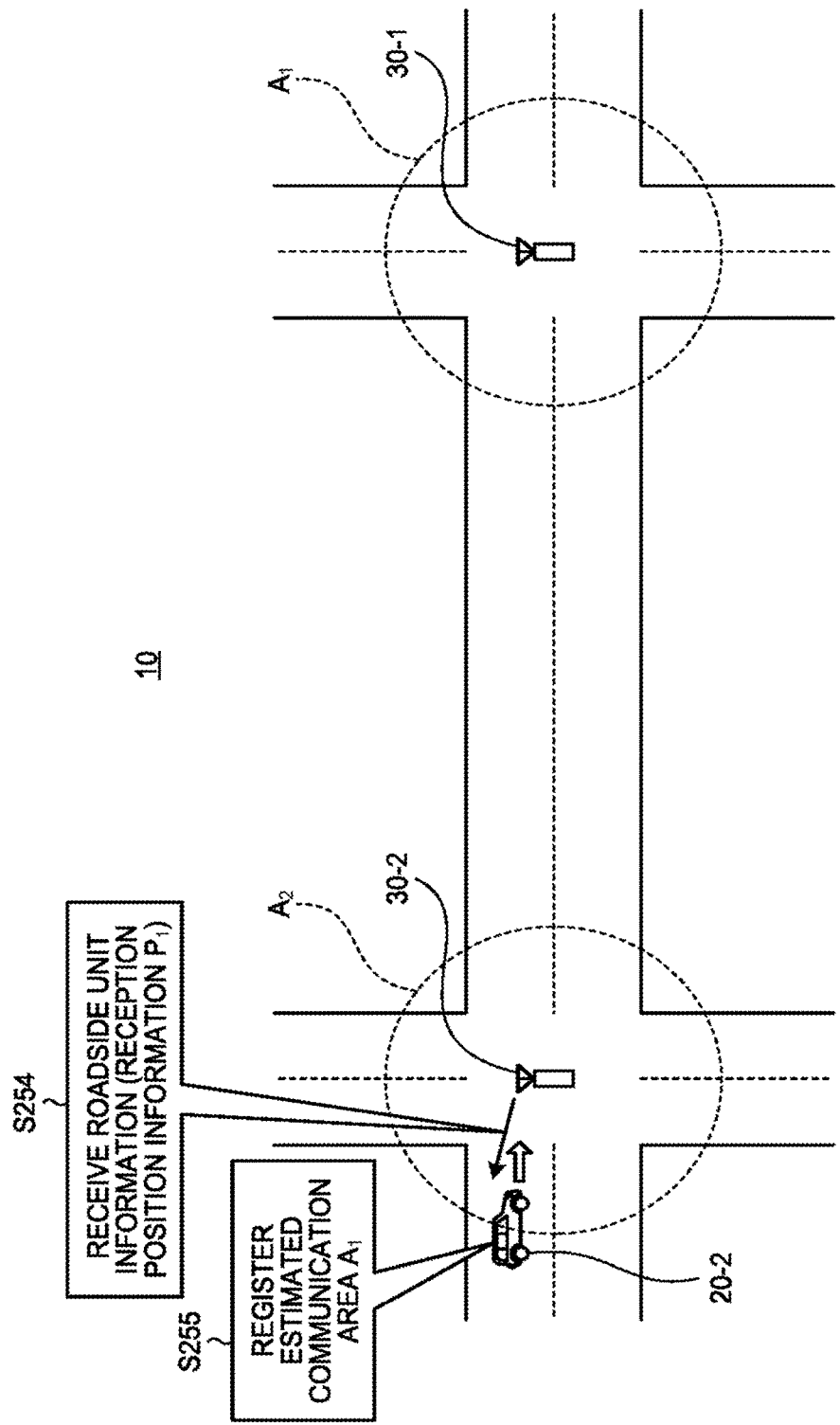
FIG. 17 is an explanatory diagram of a third process in a scenario performed in the second embodiment.

Subsequently, as illustrated in FIG. 17, it is assumed that the first vehicle 20-1 has passed the communication area $A_2$ of the second roadside unit 30-2. The first vehicle 20-1 receives the roadside unit information from the second roadside unit 30-2 (S254). The roadside unit information transmitted from the second roadside unit 30-2 includes the reception position information $P_1$ indicating the position when the first vehicle 20-1 has received the roadside unit information last time from the first roadside unit 30-1.

Upon reception of the roadside unit information from the second roadside unit 30-2, the second vehicle 20-2 extracts the reception position information $P_1$ included in the received vehicle information. The second vehicle 20-2 estimates the communication area $A_1$ of the first roadside unit 30-1 based on the reception position information $P_1$, and registers therein the estimated communication area $A_1$ (S255).

Figure 18:
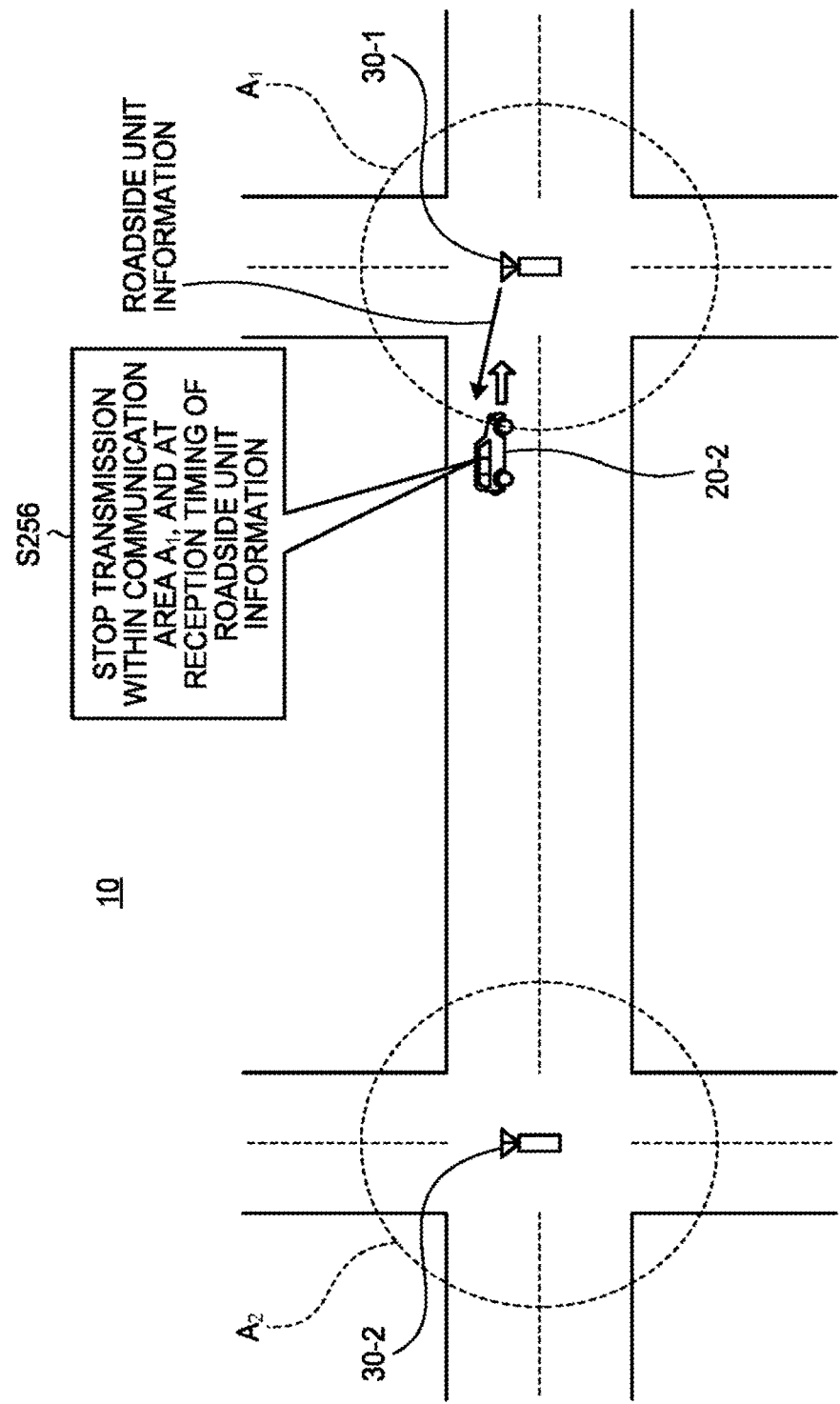
FIG. 18 is an explanatory diagram of a fourth process in a scenario performed in the second embodiment.

Subsequently, as illustrated in FIG. 18, it is assumed that the second vehicle 20-2 has reached inside the communication area $A_1$ of the first roadside unit 30-1. At this time, the second vehicle 20-2 forcibly stops transmission of the vehicle information when the position of the vehicle is within the communication area $A_1$ of the first roadside unit 30-1 and at the communication timing of the roadside unit information (S256).

Upon forcibly stopping the transmission of the vehicle information, the second vehicle 20-2 becomes a signal reception stand-by state. Accordingly, the second vehicle 20-2 can receive the roadside unit information in the communication area $A_1$ of the first roadside unit 30-1 reliably. Further, the second vehicle 20-2 can receive the roadside unit information at the earliest stage after having reached the communication area $A_1$ of the first roadside unit 30-1.

As described above, the vehicle 20 according to the second embodiment registers therein the communication area of the roadside unit 30 through which the vehicle 20 will pass in the future, based on the roadside unit information received from the roadside unit 30. When entering into the communication area of the roadside unit 30, the vehicle 20 according to the second embodiment stops the vehicle information to be transmitted by the vehicle at the reception timing of the roadside unit information. Accordingly, the vehicle 20 can receive the roadside unit information transmitted from the roadside unit 30 reliably and more quickly.

Third Embodiment

The traffic control system 10 according to a third embodiment is described next. Because the traffic control system 10 according to the third embodiment is substantially identical to that according to the second embodiment, differences therebetween are mainly described.

Figure 19:
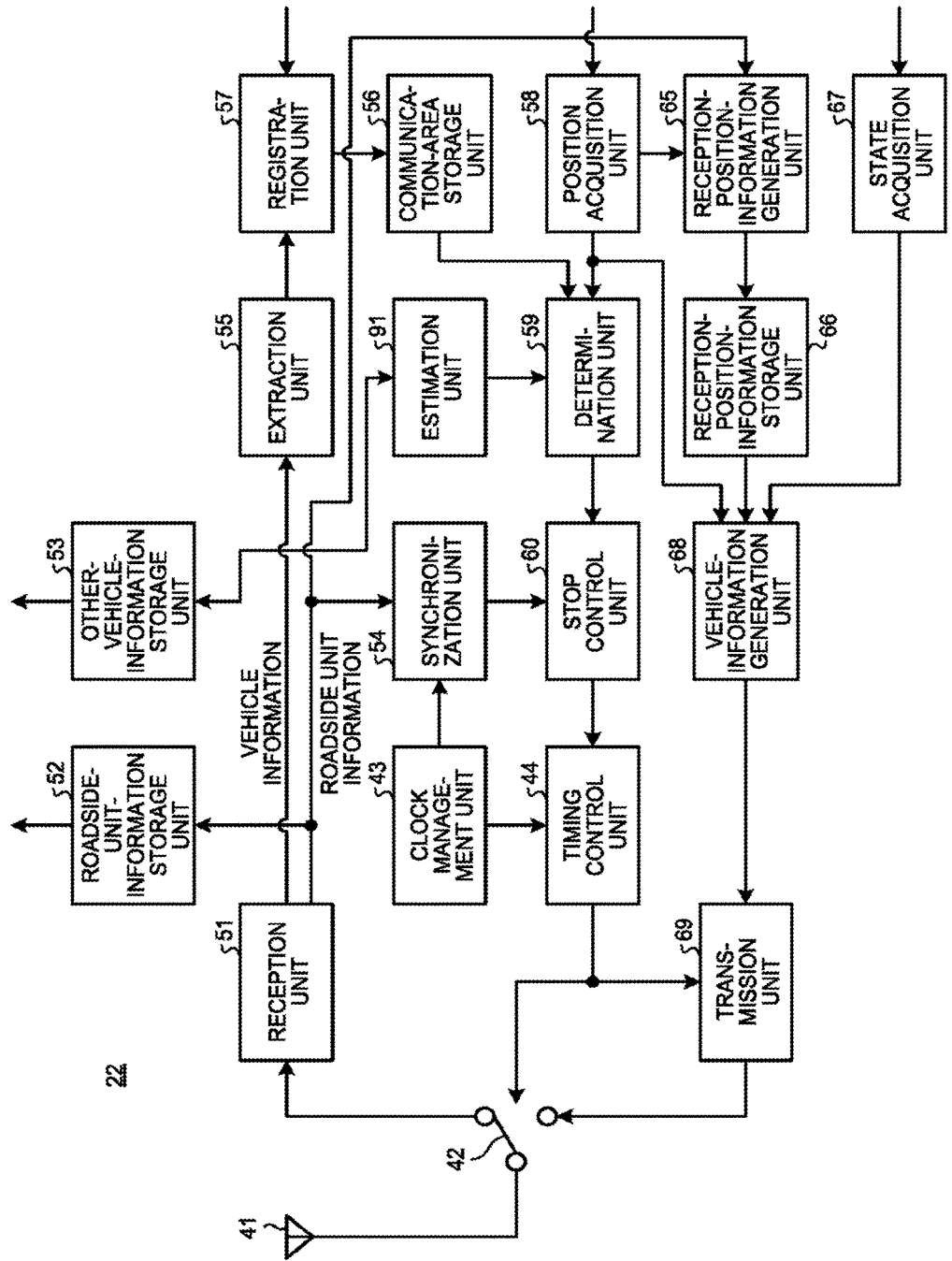
FIG. 19 is a functional configuration diagram of a vehicle communication device according to a third embodiment.

FIG. 19 is a functional configuration diagram of the vehicle communication device 22 according to the third embodiment. While the vehicle communication device 22 according to the third embodiment is different from the vehicle communication device 22 according to the first embodiment and the second embodiment in that an estimation unit 91 is further provided, other constituent elements are same as those of the first and second embodiments.

The estimation unit 91 estimates the current position of another vehicle 20 (outside vehicle) based on the vehicle information received from the outside vehicle. The estimation unit 91 estimates the current position of the outside vehicle, for example, based on the position information, the running state, and the like included in the vehicle information about the outside vehicle. The estimation unit 91 estimates the position of the outside vehicle present in a range capable of receiving the vehicle information transmitted from the vehicle, but does not estimate the position of the outside vehicle that cannot receive the vehicle information transmitted from the vehicle.

The determination unit 59 determines whether the current position of the outside vehicle estimated by the estimation unit 91 is within the communication area of any of the roadside units 30 registered in the communication-area storage unit 56, in addition to the process described in the first embodiment.

If the current position of the outside vehicle is within the registered communication area, the stop control unit 60 causes the outside vehicle to stop transmission of the vehicle information at the reception timing of the roadside unit information, in addition to the process described in the first embodiment. Accordingly, the stop control unit 60 can cause the outside vehicle to receive the roadside unit information reliably.

Figure 20:
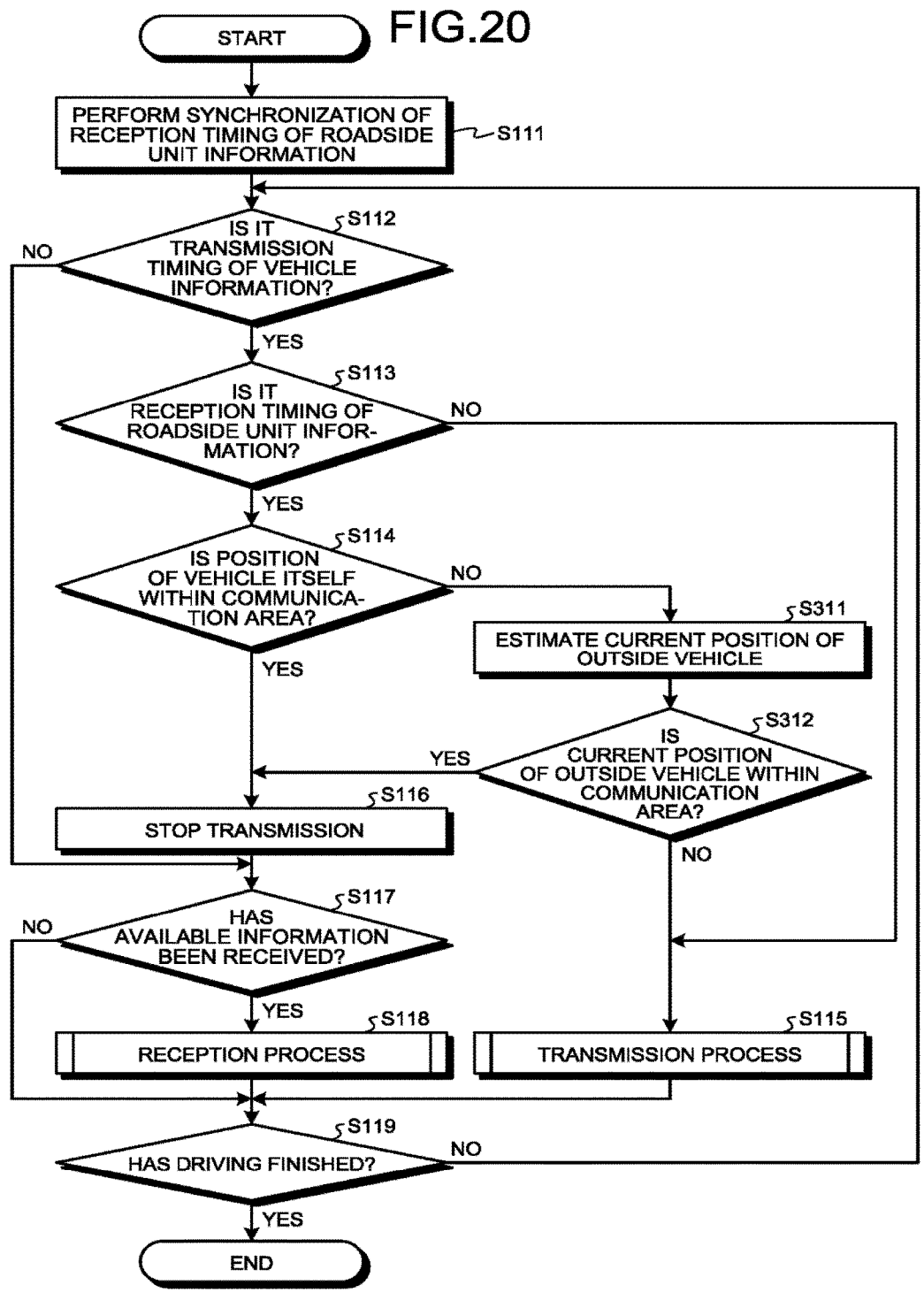
FIG. 20 is a flowchart of processes of a vehicle communication device according to the third embodiment.

FIG. 20 is a flowchart illustrating a processing flow of the vehicle communication device 22 according to the third embodiment. The vehicle communication device 22 according to the third embodiment performs the process according to the flow illustrated in FIG. 20.

While the processing in the vehicle communication device 22 according to the third embodiment is different from the flow illustrated in FIG. 4 in that processes at S311 to S312 are added, other processes are same as those in FIG. 4. The processes at S311 to S312 are described below.

If the vehicle communication device 22 determines at S114 that the position of the vehicle is not in the registered communication area (NO at S114), the vehicle communication device 22 forwards the process to S311. At S311, the vehicle communication device 22 estimates the current position of the outside vehicle. In this case, the vehicle communication device 22 estimates the current position of the outside vehicle capable of receiving the vehicle information transmitted from the vehicle, that is, the outside vehicle present within the communication area of the vehicle.

Subsequently, at S312, the vehicle communication device 22 determines whether the current position of the outside vehicle is within the registered communication area. If the current position of the outside vehicle is not within the registered communication area (NO at S312), the vehicle communication device 22 forwards the process to S115.

If the current position of the outside vehicle is within the registered communication area (YES at S312), the vehicle communication device 22 forwards the process to S116. At S116, the vehicle communication device 22 performs a transmission stopping process. Accordingly, even at the transmission timing of the vehicle information (YES at S112), if it is the reception timing of the roadside unit information (YES at S113), and if the current position of the outside vehicle is within the registered communication area (YES at S312), the vehicle communication device 22 can stop transmission of the vehicle information.

An example of a scenario performed by the traffic control system 10 according to the third embodiment is described with reference to FIGS. 21 and 22.

First, the first vehicle 20-1 has passed the communication area $A_z$ of the first roadside unit 30-1, and has registered the reception position information $P_1$ indicating the position at the timing when the roadside unit information has been received last time.

Figure 21:
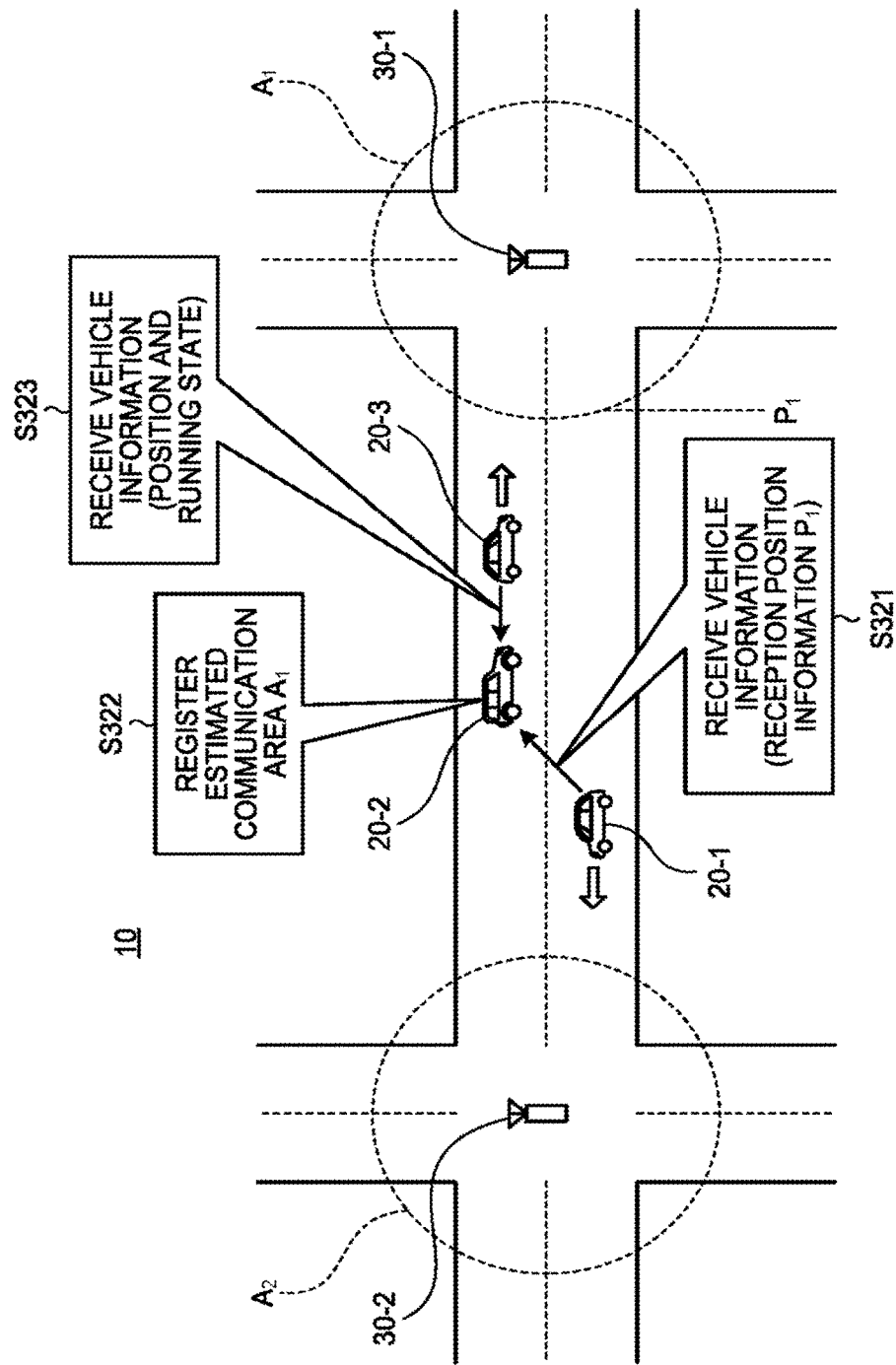
FIG. 21 is an explanatory diagram of a first process in a scenario performed in the third embodiment.

Subsequently, as illustrated in FIG. 21, it is assumed that the second vehicle 20-2 passes the first vehicle 20-1 running in an oncoming lane. At this time, the second vehicle 20-2 receives the vehicle information about the first vehicle 20-1 from the first vehicle 20-1 (S321). The vehicle information about the first vehicle 20-1 includes the reception position information $P_1$ indicating the position at which the first vehicle 20-1 has received the roadside unit information last time from the first roadside unit 30-1.

Upon reception of the vehicle information from the first vehicle 20-1, the second vehicle 20-2 extracts the reception position information $P_1$ included in the received vehicle information. The second vehicle 20-2 estimates the communication area $A_1$ of the first roadside unit 30-1 based on the reception position information $P_1$, and registers therein the estimated communication area $A_1$ (S332).

The second vehicle 20-2 also receives the vehicle information, for example, from a third vehicle 20-3 running in front (S323). The vehicle information received from the third vehicle 20-3 includes the position and the running state of the third vehicle 20-3. The second vehicle 20-2 estimates the current position of the third vehicle 20-3 based on the position, the running state, and the like of the third vehicle 20-3.

Figure 22:
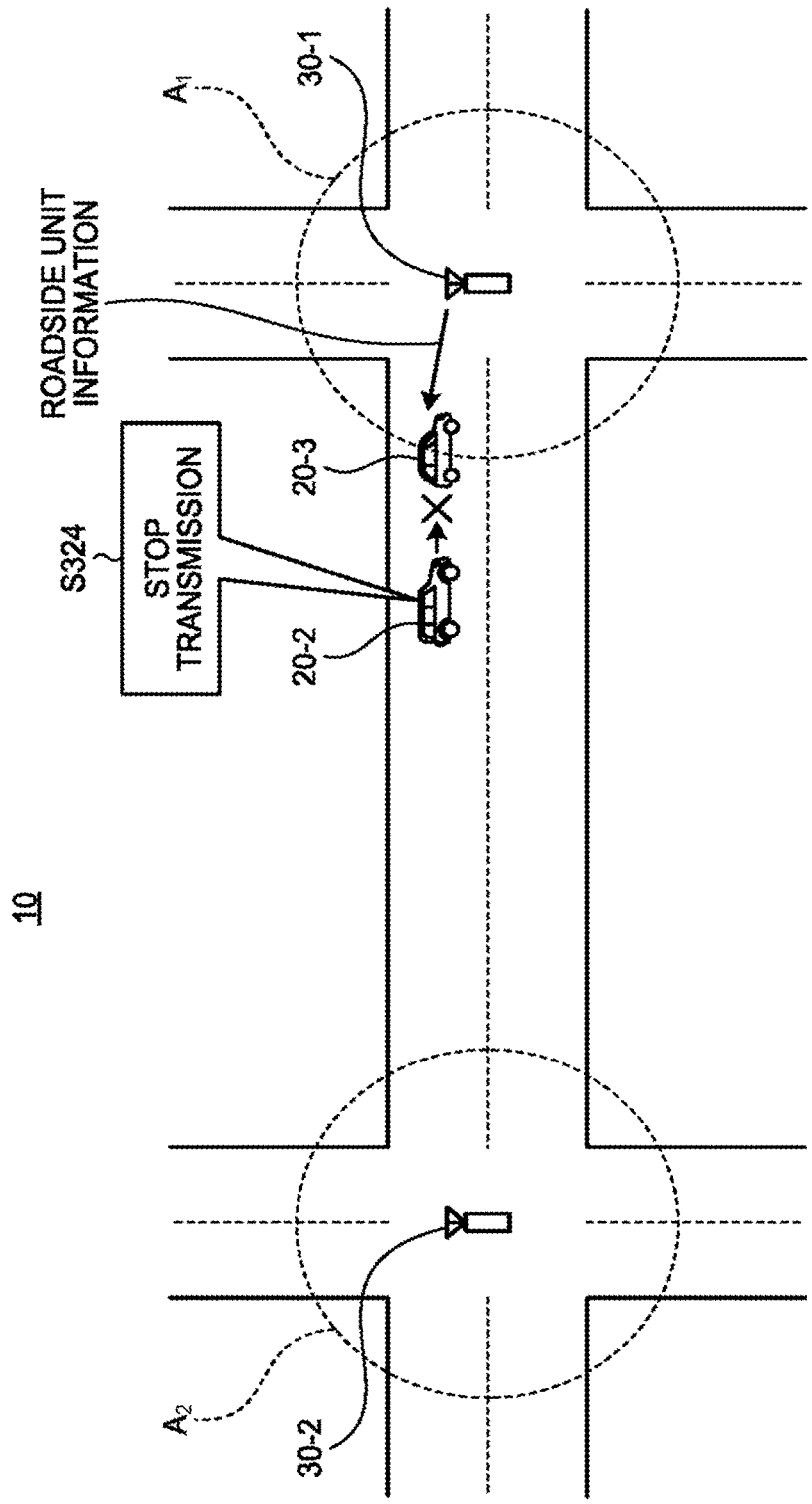
FIG. 22 is an explanatory diagram of a second process in a scenario performed in the third embodiment.

Subsequently, as illustrated in FIG. 22, the third vehicle 20-3 reaches inside the communication area $A_1$ of the first roadside unit 30-1. At this time, the second vehicle 20-2 forcibly stops transmission of the vehicle information when the current position of the third vehicle 20-3 is within the communication area $A_1$ of the first roadside unit 30-1 and at the communication timing of the roadside unit information (S324).

Accordingly, the third vehicle 20-3 receives the roadside unit information reliably in the communication area $A_1$ of the first roadside unit 30-1, because the vehicle information from the second vehicle 20-2 and the roadside unit information from the first roadside unit 30-1 do not interfere with each other.

As described above, the vehicle 20 according to the third embodiment registers the communication area of the roadside unit 30. Further, the vehicle 20 estimates the position of the another vehicle 20 (outside vehicle). The vehicle 20 according to the third embodiment then stops the vehicle information to be transmitted by the vehicle at the reception timing of the roadside unit information, when the another vehicle 20 (outside vehicle) moves into the communication area of the roadside unit 30. Accordingly, the vehicle 20 can cause the another vehicle 20 (outside vehicle) to be able to receive the roadside unit information transmitted from the roadside unit 30 reliably and more quickly.

Figure 23:
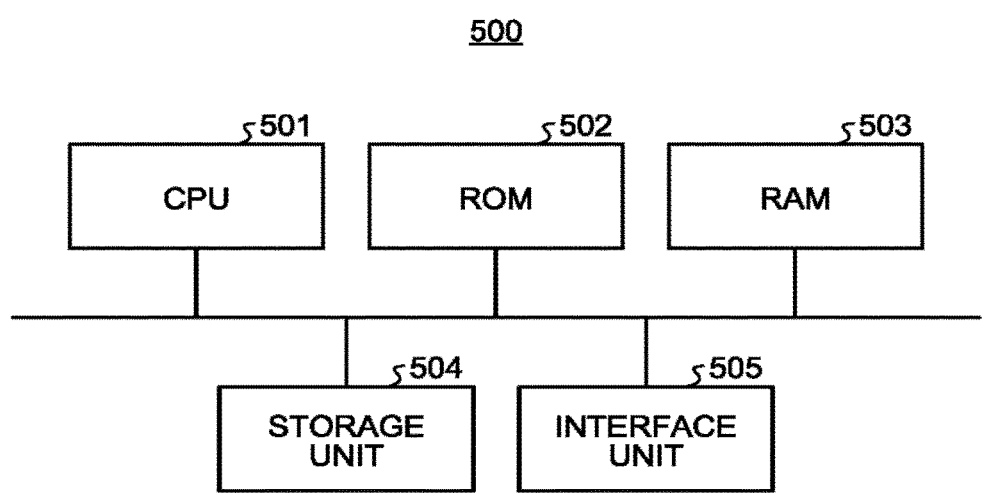
FIG. 23 is a hardware configuration diagram of an information processing device.

FIG. 23 is a diagram illustrating an example of a hardware configuration of an information processing device 500 according to the third embodiment. Partial constituent elements of the vehicle communication device 22 and the roadside-unit communication device 32 described above can be realized by the information processing device 500, for example, as illustrated in FIG. 23.

The information processing device 500 has the same configuration as that of a normal computer. That is, the information processing device 500 includes a CPU (Central Processing Unit) 501, a ROM (Read Only Memory) 502, a RAM (Random Access Memory) 503, a storage unit 504, and an interface unit 505. The CPU 501, the ROM 502, the RAM 503, the storage unit 504, and the interface unit 505 are connected to each other by a bus.

The CPU 501 develops a program stored in the storage unit 504 onto the RAM 503 to execute the program, controls the respective units to perform input and output, and performs processing of data. A start program for reading out a boot program of an operating system from the storage unit 504 onto the RAM 503 is stored in the ROM 502. The RAM 503 stores therein data as a working area of the CPU 501.

The storage unit 504 is, for example, a hard disk drive or a flash memory. The storage unit 504 stores therein an operating system, an application program, and data. These programs are recorded on a computer-readable recording medium in a file of an installable format or executable format and distributed. The programs can be distributed by downloading the programs from a server. The interface unit 505 is a device for transmitting and receiving information to and from other devices.

The program executed by the information processing device 500 according to the third embodiment is provided as it is recorded in a computer-readable recording medium such as a CD-ROM, a flexible disk (FD), a CD-R, or a DVD, in a file of an installable format or executable format. Further, the program executed by the information processing device 500 according to the third embodiment can be configured such that the program is stored in a computer connected to a network such as the Internet and downloaded via the network to be provided. Alternatively, the program executed by the information processing device 500 according to the third embodiment can be configured such that the program is provided or distributed via a network such as the Internet. Furthermore, the program according to the third embodiment can be configured such that the program is incorporated in the ROM 502 or the like in advance to be provided.

The program that causes the information processing device 500 to function as the vehicle communication device 22 includes an extraction module, a registration module, a position acquisition module, a determination module, a stop control module, a reception-position generation module, a state acquisition module, and a vehicle-information generation module. In the information processing device 500, a processor (the CPU 501) reads out the program from a storage medium (the storage unit 504 or the like) and executes the program, thereby loading the respective modules onto a main storage unit (the RAM 503). Subsequently, the processor (the CPU 501) functions as the extraction unit 55, the registration unit 57, the position acquisition unit 58, the determination unit 59, the stop control unit 60, the reception-position-information generation unit 65, the state acquisition unit 67, and the vehicle-information generation unit 68. A part or all of the extraction unit 55, the registration unit 57, the position acquisition unit 58, the determination unit 59, the stop control unit 60, the reception-position-information generation unit 65, the state acquisition unit 67, and the vehicle-information generation unit 68 can be realized by hardware other than the processor.

Furthermore, the program for causing the information processing device 500 to function as the roadside-unit communication device 32 includes a roadside-unit extraction module, a roadside-unit registration module, a traffic-light-information acquisition module, and a roadside-unit-information generation module. In the information processing device 500, the processor (the CPU 501) reads out the program from the storage medium (the storage unit 504 or the like) and executes the program, thereby loading the respective modules onto a main storage unit (the RAM 503). Subsequently, the processor (the CPU 501) functions as the roadside-unit extraction unit 82, the roadside-unit registration unit 84, the traffic-light-information acquisition unit 85, and the roadside-unit-information generation unit 86. A part or all of the roadside-unit extraction unit 82, the roadside-unit registration unit 84, the traffic-light-information acquisition unit 85, and the roadside-unit-information generation unit 86 can be realized by hardware other than the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device that is provided in a movable body and is wirelessly communicable with a transceiver unit and with another movable body via a predetermined channel, the communication device comprising:

a transmitter configured to transmit movable body information on the movable body to the predetermined channel;

a receiver configured to receive transceiver unit information that the transceiver unit has transmitted to the predetermined channel; and processing circuitry configured to:
perform a synchronization of a reception timing when the transceiver unit information can be received;
register a communication area of the transceiver unit calculated based on a position at which the another movable body has received the transceiver unit information in communication-area storage; and
stop transmission of the movable body information at a reception timing of the transceiver unit information, when a position of the movable body is within the registered communication area.

2. The device according to claim 1, wherein
the another movable body generates reception position information including a position at which the another movable body has received the transceiver unit information last time or the communication area calculated based on the position at which the another movable body has received the transceiver unit information last time, and transmits the movable body information including the generated reception position information to the predetermined channel,
the receiver receives the movable body information that the another movable body transmits to the predetermined channel, and
the processing circuitry registers, in the communication-area storage, the communication area calculated based on the position included in the reception position information extracted from the movable body information received from the another movable body or the communication area included in the reception position information.

3. The device according to claim 1, wherein
the another movable body generates reception position information including a position at which the another movable body has received last time the transceiver unit information transmitted from a first transceiver unit being a transmission source, or the communication area of the first transceiver unit calculated based on the position at which the another movable body has received last time the transceiver unit information transmitted from the first transceiver unit, and transmits the movable body information including the generated reception position information to the predetermined channel,
a second transceiver unit receives the movable body information from the another movable body, and transmits the transceiver unit information including the reception position information included in the received movable body information to the predetermined channel, and
the processing circuitry registers, in the communication-area storage, the communication area of the first transceiver unit calculated based on the position included in the reception position information extracted from the transceiver unit information, or the communication area of the first transceiver unit included in the reception position information.

4. The device according to claim 2, wherein, when new reception position information is extracted, under a condition that new communication area calculated based on a position indicated in the new reception position information or the new communication area included in the new reception position information is wider than the communication area registered therein, the processing circuitry registers the new communication area in the communication-area storage.

5. The device according to claim 1, wherein
the processing circuitry is further configured to generate the movable body information including a running state of the movable body.

6. The device according to claim 1, wherein
the processing circuitry is further configured to estimate a current position of an outside movable body based on the movable body information received from the outside movable body, and
the processing circuitry stops transmission of the movable body information at a reception timing of the transceiver unit information, when the current position of the outside movable body is within the registered communication area.

7. A communication device that is provided in a movable body and performs wireless communication with a transceiver unit and with another movable body via a predetermined channel, the communication device comprising:
a receiver configured to receive transceiver unit information transmitted from the transceiver unit to the predetermined channel;
a transmitter; and
processing circuitry configured to:
acquire a position of the movable body;
generate reception position information including the position of the movable body at a time of receiving the transceiver unit information from the transceiver unit, or a communication area of the transceiver unit calculated based on the position of the movable body at a time of receiving the transceiver unit information from the transceiver unit; and
generate movable body information including the reception position information, and
the transmitter is configured to transmit the generated movable body information to the predetermined channel.

8. The device according to claim 7, wherein the processing circuitry generates the movable body information including a running state of the movable body and the reception position information.

9. A communication device that is wirelessly communicable with movable bodies via a predetermined channel, wherein
a first movable body generates reception position information including a position at which the first movable body has received last time transceiver unit information transmitted from a first transceiver unit being a transmission source, or a communication area of the first transceiver unit calculated based on the position at which the first movable body has received last time the transceiver unit information transmitted from the first transceiver unit, and transmits movable body information including the generated reception position information to the predetermined channel,
the communication device is provided in a second transceiver unit, and
the communication device comprises:
a transceiver-unit receiver configured to receive the movable body information transmitted from the first movable body to the predetermined channel;
a transceiver-unit transmitter; and
processing circuitry configured to:

register the reception position information extracted from the received movable body information in transceiver-unit storage; and generate the transceiver unit information including the registered reception position information, and the transceiver-unit transmitter is configured to transmit the generated transceiver unit information to the predetermined channel.

10. The device according to claim 9, wherein the processing circuitry generates the transceiver unit information including traffic-light information representing a command to be provided to the movable body by a traffic light.

11. A communication method executed by a communication device that is provided in a movable body and is wirelessly communicable with a transceiver unit and with another movable body via a predetermined channel, the communication method comprising:

transmitting movable body information on the movable body to the predetermined channel;

receiving transceiver unit information that the transceiver unit has transmitted to the predetermined channel;

performing a synchronization of a reception timing when the transceiver unit information can be received;

registering, in communication-area storage, a communication area of the transceiver unit calculated based on a position at which the another movable body has received the transceiver unit information; and stopping transmission of the movable body information at the reception timing of the transceiver unit information, when a position of the movable body is within the registered communication area.

12. The method according to claim 11, wherein the another movable body generates reception position information including a position at which the another movable body has received the transceiver unit information last time or the communication area calculated based on the position at which the another movable body has received the transceiver unit information last time, and transmits the movable body information including the generated reception position information to the predetermined channel, the receiving includes receiving the movable body information that the another movable body transmits to the predetermined channel, and the registering includes registering, in the communication-area storage, the communication area calculated based on the position included in the reception position information extracted from the movable body information received from the another movable body or the communication area included in the reception position information.

13. The method according to claim 12, wherein, when new reception position information is extracted, under a condition that new communication area calculated based on a position indicated in the new reception position information or the new communication area included in the new reception position information is wider than the communication area registered therein, the registering includes registering the new communication area in the communication-area storage.

14. The method according to claim 11, wherein the another movable body generates reception position information including a position at which the another movable body has received last time the transceiver unit information transmitted from a first transceiver unit being a transmission source, or the communication area of the first transceiver unit calculated based on the position at which the another movable body has received last time the transceiver unit information transmitted from the first transceiver unit, and transmits the movable body information including the generated reception position information to the predetermined channel, a second transceiver unit receives the movable body information from the another movable body, and transmits the transceiver unit information including the reception position information included in the received movable body information to the predetermined channel, and the registering includes registering, in the communication-area storage, the communication area of the first transceiver unit calculated based on the position included in the reception position information extracted from the transceiver unit information, or the communication area of the first transceiver unit included in the reception position information.

15. The method according to claim 11, further comprising generating the movable body information including a running state of the movable body.

16. The method according to claim 11, further comprising estimating a current position of an outside movable body based on the movable body information received from the outside movable body, wherein the stopping includes stopping transmission of the movable body information at a reception timing of the transceiver unit information, when the current position of the outside movable body is within the registered communication area.

* * * * *